(12) United States Patent
Kondo et al.

(10) Patent No.: US 12,165,460 B2
(45) Date of Patent: Dec. 10, 2024

(54) ARTICLE SUPPLY APPARATUS AND ARTICLE SUPPLY SYSTEM

(71) Applicants: BANDAI CO.,LTD., Tokyo (JP); WAKO LLC., Nagano (JP)

(72) Inventors: Hajime Kondo, Tokyo (JP); Hiroki Kobayashi, Tokyo (JP); Akira Mizushina, Nagano (JP)

(73) Assignees: BANDAI CO., LTD., Tokyo (JP); WAKO LLC., Nagano (JP)

( * ) Notice: Subject to any disclaimer, the term of this patent is extended or adjusted under 35 U.S.C. 154(b) by 0 days.

(21) Appl. No.: 18/172,040

(22) Filed: Feb. 21, 2023

(65) Prior Publication Data
US 2023/0267794 A1 Aug. 24, 2023

(30) Foreign Application Priority Data
Feb. 22, 2022 (JP) .................... 2022-025874

(51) Int. Cl.
*G07F 17/12* (2006.01)
*G06Q 20/18* (2012.01)
*G06Q 20/40* (2012.01)

(52) U.S. Cl.
CPC ........... *G07F 17/12* (2013.01); *G06Q 20/401* (2013.01)

(58) Field of Classification Search
CPC .......... G07F 17/12; G07F 9/023; G07F 9/026; G07F 11/005; G07F 9/001; G07F 11/16; G07F 11/24; G06Q 20/401; G06Q 20/18
See application file for complete search history.

(56) References Cited

U.S. PATENT DOCUMENTS

| | | | | | |
|---|---|---|---|---|---|
| 6,050,447 | A | * | 4/2000 | Kovens | G07F 9/002 221/265 |
| 10,339,748 | B1 | * | 7/2019 | Chang | G07F 11/56 |
| 10,806,292 | B2 | * | 10/2020 | Ratterman | A47J 31/525 |
| 2001/0010315 | A1 | * | 8/2001 | Tomioka | G07F 11/44 221/124 |

(Continued)

FOREIGN PATENT DOCUMENTS

| | | | |
|---|---|---|---|
| JP | 2006-268247 A | 10/2006 | |
| JP | 2021-039400 A | 3/2021 | |
| KR | 0156140 B1 * | 12/1998 | ............. G07F 11/16 |

OTHER PUBLICATIONS

KR0156140B1—Device and Method Which Express and Resolve Lock State for Automatic Vending Machine, 5 pages. (Year: 2023).*

(Continued)

*Primary Examiner* — Tuyen K Vo

(57) ABSTRACT

An article supply apparatus capable of supplying an article, comprises an accommodation unit in which articles are accommodated; a supply unit which supplies at least one of the articles accommodated in the accommodation unit; an operation unit capable of performing an operation in order to supply the at least one of the articles from the supply unit; a lock unit which locks the operation unit so as to make the operation to the operation unit unavailable; a control unit which releases a lock of the lock unit; and a notification control unit, capable of notifying a first state where the lock of the lock unit and a second state where the operation of the operation unit is completed, wherein a way of notification of the first state is different from that of the second state.

12 Claims, 29 Drawing Sheets

(56) References Cited

U.S. PATENT DOCUMENTS

| | | | |
|---|---|---|---|
| 2005/0178790 A1* | 8/2005 | Ishida | G07F 11/24 221/277 |
| 2006/0011646 A1* | 1/2006 | Chirnomas | G07F 11/1657 221/210 |
| 2011/0139809 A1* | 6/2011 | Sawh | G07F 9/105 221/150 A |
| 2012/0239189 A1* | 9/2012 | Jaud | G07F 9/0235 700/236 |
| 2012/0277904 A1* | 11/2012 | Pritchard | G07F 11/165 221/154 |
| 2013/0013107 A1* | 1/2013 | Felique | G07F 9/00 700/244 |

OTHER PUBLICATIONS

JP2021039400A Article Supply Device, Article Supply System, and Settlement System, 10 page. (Year: 2024).*

Japan Patent Office, Office Action for Japanese Patent Application No. 2022-025874, Jan. 18, 2023 (A machine translation is attached hereto).

* cited by examiner

Article supply apparatus data D1

| Device ID | Stock quantity |
|---|---|
| 12560 | 50 |
| 12566 | 32 |
| ⋮ | ⋮ |
| 15678 | 10 |

FIG. 13

| Serial code | Authentication flag |
|---|---|
| 1VB3588 | |
| 561GE77 | |
| ... | ... |
| 38OUR11 | 1 |

FIG. 14

ARTICLE SUPPLY APPARATUS AND ARTICLE SUPPLY SYSTEM

CROSS-REFERENCE TO RELATED APPLICATIONS

The disclosure of Japanese Patent Application No. 2022-025874 filed on Feb. 22, 2022 including specification, drawings and claims is incorporated herein by reference in its entirety.

TECHNICAL FIELD

Described herein are an article supply apparatus and an article supply system.

BACKGROUND ART

Conventionally, in some of article supply apparatuses, a user is notified of information regarding an article to be discharged from now just before the article such as a capsule toy accommodated in a main body of the apparatus is supplied. For example, Japanese Patent Application Publication No. 2006-268247 teaches such an apparatus.

SUMMARY

There is a demand that information regarding a state of an article supply apparatus itself be notified, instead of such information regarding the article to be discharged. Proposed herein are an article supply apparatus and article supply system capable of notifying of the state of the article supply apparatus.

As an embodiment, an article supply apparatus capable of supplying an article, comprises an accommodation unit which accommodates articles, an article supply unit which supplies at least one of the articles accommodated in the accommodation unit, an operation unit capable of an operation for supplying at least one of the articles from the article supply unit, a lock unit which locks the operation unit so that the operation unit cannot be operated, a control unit which releases the lock by the lock unit, and a notification unit which notifies a user of a first state where the lock by the lock unit is released and a second state where an operation by the operation unit is completed, in different manners.

By the configuration, it is possible to provide an article supply apparatus and an article supply system capable of notifying a user of a state of the article supply apparatus.

BRIEF DESCRIPTION OF DRAWINGS

For a more complete understanding, and the advantages thereof, reference is now made to the following description taken in conjunction with the accompanying drawings, in which:

FIG. 13 is a diagram showing an example of article supply apparatus data D1;

FIG. 14 is a diagram showing an example of serial code data D2;

DETAILED DESCRIPTION

A description of embodiments will now be given below, referring to drawings. While the claims are not limited to such embodiments, an appreciation of various aspects of the invention is best gained through a discussion of various examples thereof. Further, combinations of elements or features described below are not necessarily indispensable. Two or more elements or features described below may be arbitrarily combined. The same symbols or signs are assigned to the same elements or similar elements and duplicate explanation thereof will be omitted.

Overview of Embodiments

Although only some exemplary embodiments have been described in detail above, those skilled in the art will readily appreciate that many modifications are possible in the exemplary embodiments without materially departing from the novel teachings and advantages. Accordingly, all such modifications are intended to be included within the scope.

In order for a user to receive an article from the article supply apparatus, the user needs to perform an operation to the article supply apparatus by himself or herself. A time period during which the user can perform such an operation to the article supply apparatus, is provided in order to prevent a theft or an erroneous operation. Therefore, the article supply apparatus preferably notifies the user of a state of the article supply apparatus itself so that the user may perform an operation to the article supply apparatus without messing up operation timing etc.

For example, the user can be correctly guided for an operation by disposing a display screen such as a liquid crystal display on the article supply apparatus so as to display a procedure and timing for supplying an article on the display screen. However, since a large number of article supply apparatuses are intended to be installed in various sites including outdoors, the structure of the article supply apparatus is made simple and the costs thereof are limited, by taking, into consideration, installation costs for the article supply apparatuses, the installation sites thereof and operation and management thereof. While the structure of the article supply apparatus is made simple, it is desired that the user be notified of a state of the article supply apparatus so that the user can perform an operation without mistaking timing of the operation etc.

First Embodiment

A first embodiment will be described below. In the first embodiment, described below is a configuration of the article supply apparatus in which the article supply apparatus notifies a user of an operable state where a user can operate the article supply apparatus, and an operation completed state where the user has completed the operation.

Figure 1:
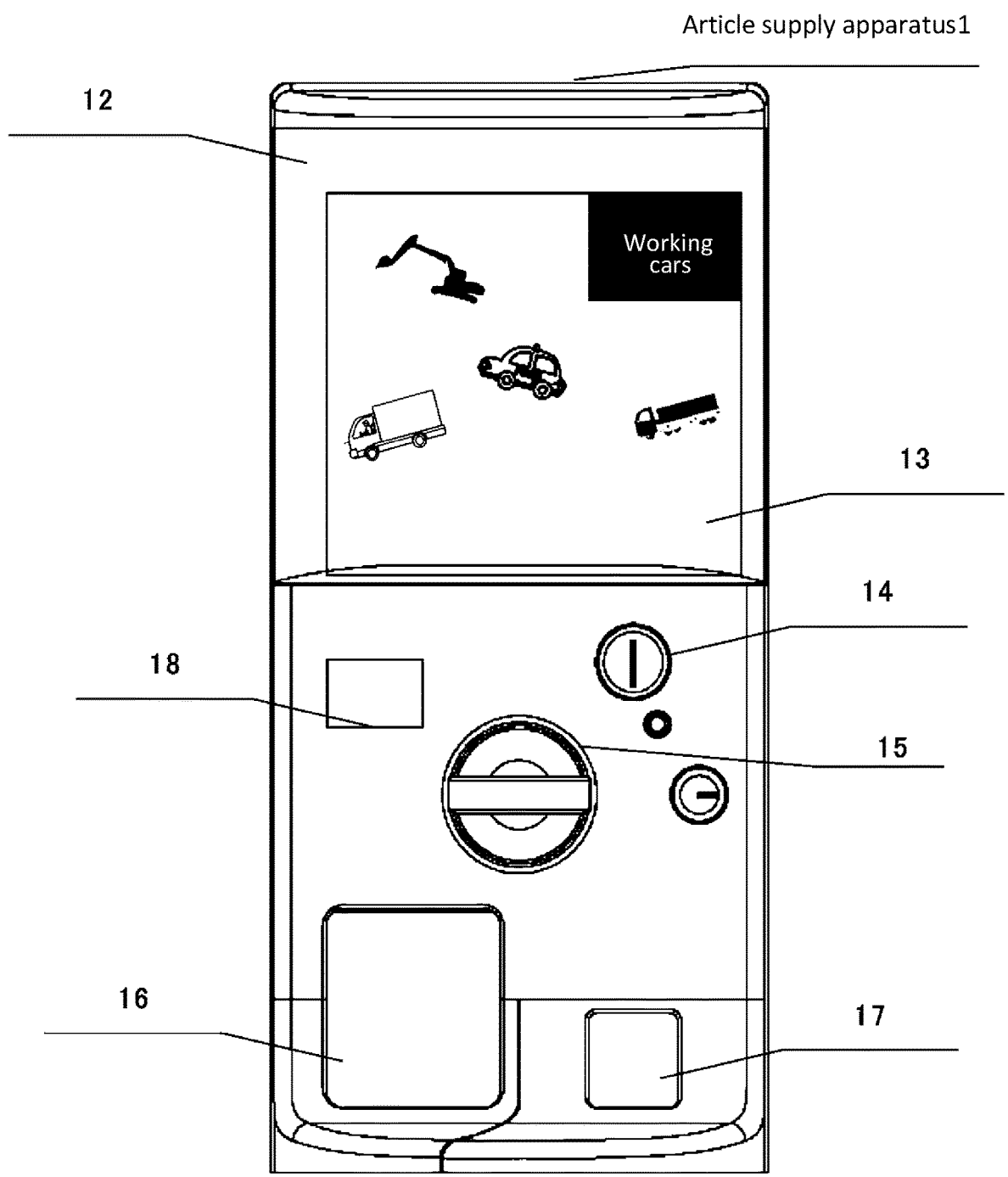
FIG. 1 is a front view of an article supply apparatus according to embodiments of the present invention.

FIG. 1 is a front view of an example of an article supply apparatus 1 in an article supply apparatus system according to the first embodiment. In this embodiment, the article supply apparatus 1 accommodates a plurality of articles and, supplies one article randomly selected from the accommodated articles, to the user. The article supply apparatus comprises an accommodation unit 12, a display 13 which displays the detail of the articles accommodated in the accommodation unit 12, a coin feeding port 14, a handle 15 as an operation unit, a take-out port 16 to which an article is supplied, a coin return port 17, and a notification unit 18.

The articles can be easily accommodated in the article accommodation unit 12 by pulling the accommodation unit 12 toward the user side and putting the articles therein from a side of the article supply unit 1. A display which is the same as the display 13 is used for article supply apparatus in which the same articles are supplied. When the articles accommodated in the article supply apparatus 12 are replaced with another kind thereof, the information about the articles shown on the display 13 is changed therefor. The information about the article includes the name of the articles, explanatory information of the articles and an explanatory image thereof.

The notification unit 18 comprises a light-emitting element such as an LED and a transparent member, wherein light from the light-emitting element becomes visible through the transparent member. Although the color and the number of the light-emitting elements do not matter, the present embodiment will be explained using an example in which a green light-emitting element is arranged. In addition, the notification unit 18 may be a speaker outputting voice and/or sound.

Figure 2:
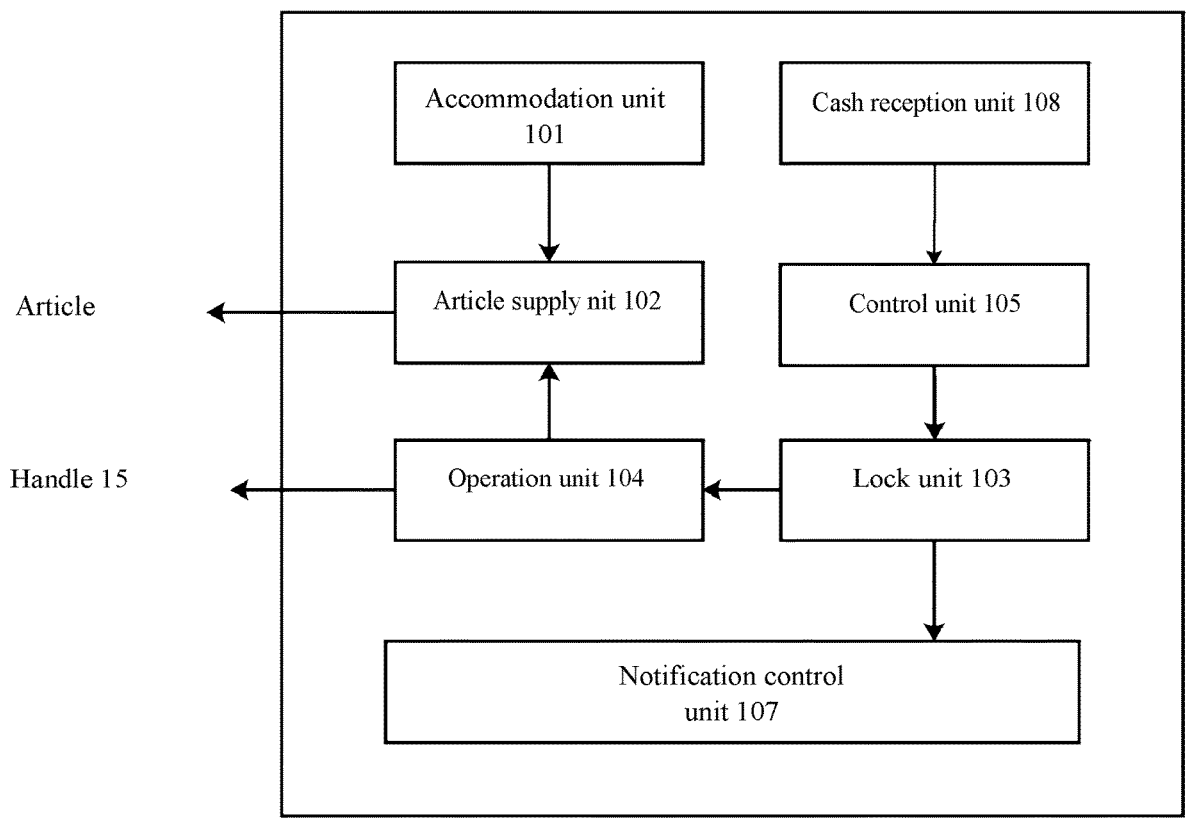
FIG. 2 is a block diagram of the article supply apparatus according to a first embodiment.

Next, the structure of each unit will be explained below. FIG. 2 is a functional block diagram of the article supply apparatus 1 according to a first embodiment. The article supply apparatus 1 comprises an article accommodation unit 101, an article supply unit 102, a lock unit 103, an operation unit 104, a control unit 105, a notification control unit 107 and a cash reception unit 108.

The article accommodation unit 101 shown in FIG. 2 is the same as the article accommodation unit 12 shown in FIG. 1, and accommodates a large number of articles. The article supply unit 102 having a rotary table is arranged inside the article accommodation unit 101 and in a lower part thereof. Holes are formed in the rotary table, and each of the holes has such a size that an article can pass therethrough. The lock unit 103 locks or unlocks the operation unit 104. When the lock unit 103 performs a locking operation to the operation unit 104, the lock unit 103 informs the notification control unit 107 that the lock of the operation unit is locked. Similarly, when the lock unit releases the lock of the operation unit 104, the lock unit 103 informs the notification control unit 107 that the lock of the operation unit 104 is released.

The operation unit 104 transmits an operation performed to the handle 15 shown in FIG. 1, to the rotary table of the article supply unit 102. The operation unit 104 is locked by the lock unit 103. When the lock is released, the handle becomes rotatable by an operation performed 0078 by the user. A lock releasing mechanism which uses, for example, a solenoid is used as the mechanism for locking the operation unit 104. In this case, the handle 15 is made nonrotatable (a locked state) by using the solenoid, and the lock thereof is released by energizing the solenoid so that the handle 15 is made rotatable. In addition, the lock mechanism is not limited to the above-described mechanism, which uses such a solenoid, and another type of lock mechanism may be used. The rotary table is rotated in a state interlocked with the handle 15 by rotating the handle 15 when the lock unit 103 is in a unlock state. When the hole of the rotary table and a drop opening formed in the bottom of the article accommodation unit 101 face each other by rotating the handle by a certain angle, one of the articles passes through a path connected to the take-out port 16, and is supplied to the take-out port 16.

The control unit 105 controls the locking and unlocking of the lock unit 103. The control unit 105 releases the lock of the lock unit 103 when a settlement by cash, which is fed in the feeding port 14, is performed. In addition, the control unit 105 causes the lock unit 103 to be locked after it is detected that the article is discharged in the take-out port 16 or in lapse of a predetermined time after the release of the lock. Further, the control unit 105 may cause the lock unit 103 to be locked based on a lock signal which is controlled from the outside.

The notification control unit 107 notifies of a state of the article supply apparatus 1 by controlling a speed of lighting, light-out and blinking the light-emitting element. In addition, patterns of lighting, light-out and blinking the light-emitting element are different from one another, depending on the state of the article supply apparatus 1. In the present embodiment, the article supply apparatus 1 has two types of states thereof to be notified, that is, an operable state (a first state) and an operation completed state (a second state). Therefore, the notification control unit 107 controls the speed of lighting, light-out and blinking of the light-emitting element so that the pattern of lighting, light-out and blinking of the light-emitting element in the operable state (first state) becomes different from those in the operation completed state (second state).

The operable state is a state where the lock unit 103 is released. When the lock of the lock unit 103 is released, the article supply apparatus is turned into a state of waiting an operation to be performed to the operation unit 104 (handle 15) by the user. The control unit 105 releases the lock of the lock unit 103, on condition that the cash reception unit 108 (described later) detects that cash equivalent to the price of the article is fed. That is, the notification control unit 107 controls notification of the operable state on condition of payment of a price made by the user. In the operable state, the notification control unit 107 performs notification by controlling the light-emitting element to blink at a predetermined interval.

In the operable state, the operation to the operation unit 104 is completed by the user and the lock unit 103 is locked so that an operation to the operation unit 104 cannot be performed. The notification control unit 107 performs notification of the operation completed state by controlling the notification unit 18 on condition that the lock unit 103 is locked. In the operation completed state, the notification control unit 107 performs notification by controlling the notification unit 18 to constantly light the light-emitting element. In addition, since a series of steps for the supply process has been completed after an operation to the operation unit 104 was performed, the article supply apparatus 1 is in a standby state for waiting the next supply process after the lock unit 103 is locked. Therefore, the operation completed state (second state) may also be referred to as a standby state. Accordingly, in the explanation below, the operation completed state is also referred to as a standby state (second state).

The cash reception unit 108 detects whether or not the fed cash reaches the article supply price. When the cash reception unit 108 receives a lock release signal via the communication unit 106 from the server 3, the cash reception unit 108 switches the function of a coin selection unit (not shown) for selecting a certain coin from fed coins, from an initial invalid state (off state) to a valid state (on state). A passage of coins fed in the coin feeding port 14 is divided into a passage which passes through the coin selection unit (not shown) provided inside the apparatus and proceeds to the coin return port 17 and a passage which passes through the coin selection unit and proceeds to a storage unit (not shown) in which coins are stored. In the case where the coin selection unit is in the invalid state, the fed coin passes through the coin selection unit as it is, and is discharged from the coin return port 17. In the case where the coin selection unit is in the valid state, the coin selection unit selects usable coins for payment and sends them to the storage unit (not shown), and discharges improper (unusable) coins from the coin return port 17. The coin selection unit sorts coins which are usable for payment, by type. The cash reception unit 108 counts the number of coins sorted based on the type thereof by the coin selection unit, according to type by a sensor, and acquires the amount of the fed cash. And the cash reception unit 108 sends a lock release signal to the control unit 105 when the fed cash reaches the set price for an article. The price (amount of the cash) of the article is set in the cash reception unit 108 by the server 3 or manually.

Figure 3:
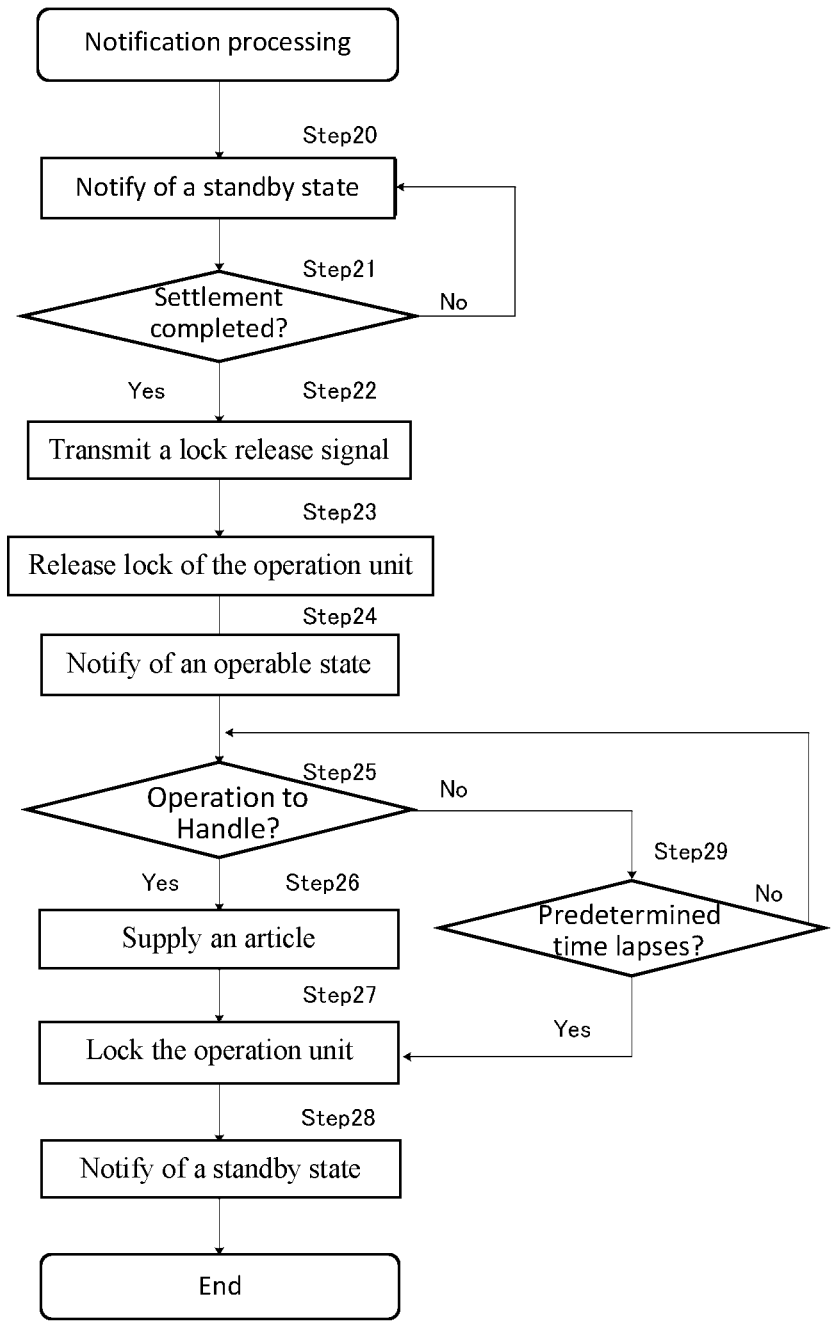
FIG. 3 is a flowchart illustrating an operation of the article supply apparatus according to the first embodiment.
Figure 4:
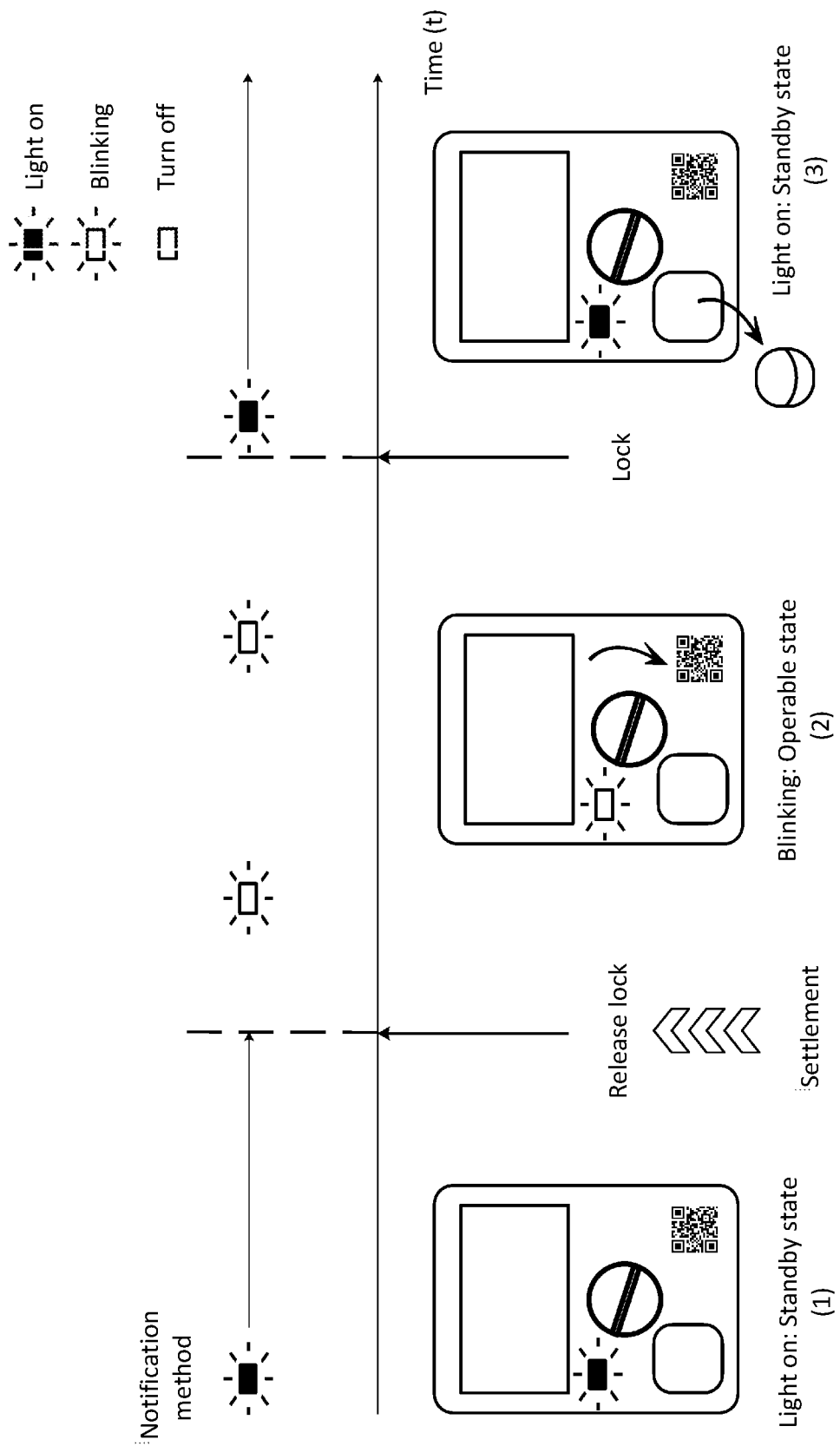
FIG. 4 is a diagram showing a timeline of notification according to the first embodiment.

Next, an operation of the article supply apparatus 1 according to the present embodiment, will be explained referring to FIGS. 3 and 4. FIG. 3 is a flowchart of notification processing in the article supply apparatus 1 according to the first embodiment. FIG. 4 is a timeline diagram illustrating a notification method controlled by the notification control unit 107. The notification control unit 107 turns on the light-emitting element by controlling the notification unit 18 in order to notify of the standby state indicating that supply of an article is waiting (Step 20). At this time, the notification unit 18 is lighted as shown as (1) in FIG. 4. The cash reception unit 108 determines whether or not the fed cash reaches the price of the article (Step 21). When the fed cash reaches the price of the article, a lock release signal is sent to the control unit 105 (Step 22). When the control unit 105 receives the lock release signal from the cash reception unit 108, the control unit 105 unlocks or releases the lock of the lock unit 103 (Step 23). When the notification control unit 107 receives the notification about the release from the lock unit 22, the notification control unit 107 causes the light-emitting element to be blinked by controlling the notification unit 18 in order to notify of the operable state (first state) indicating that an operation to the handle 15 is available (Step 24). At this time, the notification unit 18 is blinked as shown as (2) in FIG. 4.

For determination as to supply of article, the control unit 105 of the article supply apparatus 1 determines whether or not an operation (for example, one rotation) to the handle 15 of the operation unit 104 has been performed (Yes in Step 25). When the operation to the handle 15 (for example, one rotation) is performed (Yes in Step 25), one article is supplied from the article supply unit 102 to the take-out port 16 (Step 26). And the control unit 105 locks the lock unit 103 (Step 27). On the other hand, when no operation is performed to the handle 15 (No in Step 25), the control unit 105 determines whether or not a predetermined time lapses after release of the lock (for example, 1 minute) (No in Step 29). When no operation is performed to the handle 15 (No in Step 25) and the predetermined time (for example, 1 minute) lapses after release of the lock (Yes in Step 29), the control unit 105 locks the lock unit 103 (Step 26).

When the notification control unit 107 receives a notification about the lock from the lock unit 103, the notification control unit 107 controls the notification unit 18 so as to light the light-emitting element (Step 28) in order to notify of the operation completed state (standby state). At this time, the notification unit 18 is lighted as shown as (3) in FIG. 4.

As described above, the notification control unit 107 notifies of an operable state of the article supply apparatus by controlling blinking of the notification unit 18, and notifies of an operation completed state by controlling lighting of the notification unit 18. That is, the notification control unit 107 notifies of a state the article supply apparatus by lighting or blinking of the light-emitting element. By the configuration, the user can know the timing of the operation to be performed to the article supply apparatus 1. Therefore, it is possible to prevent the user from making an operation mistake at time of article supply. Also, it is possible to make the configuration of the article supply apparatus simple, by using a light-emitting element as the notification unit, whereby installation sites of the article supply apparatus can be easily selected, and operation and management thereof can be easily performed.

First Modified Example

Figure 5:
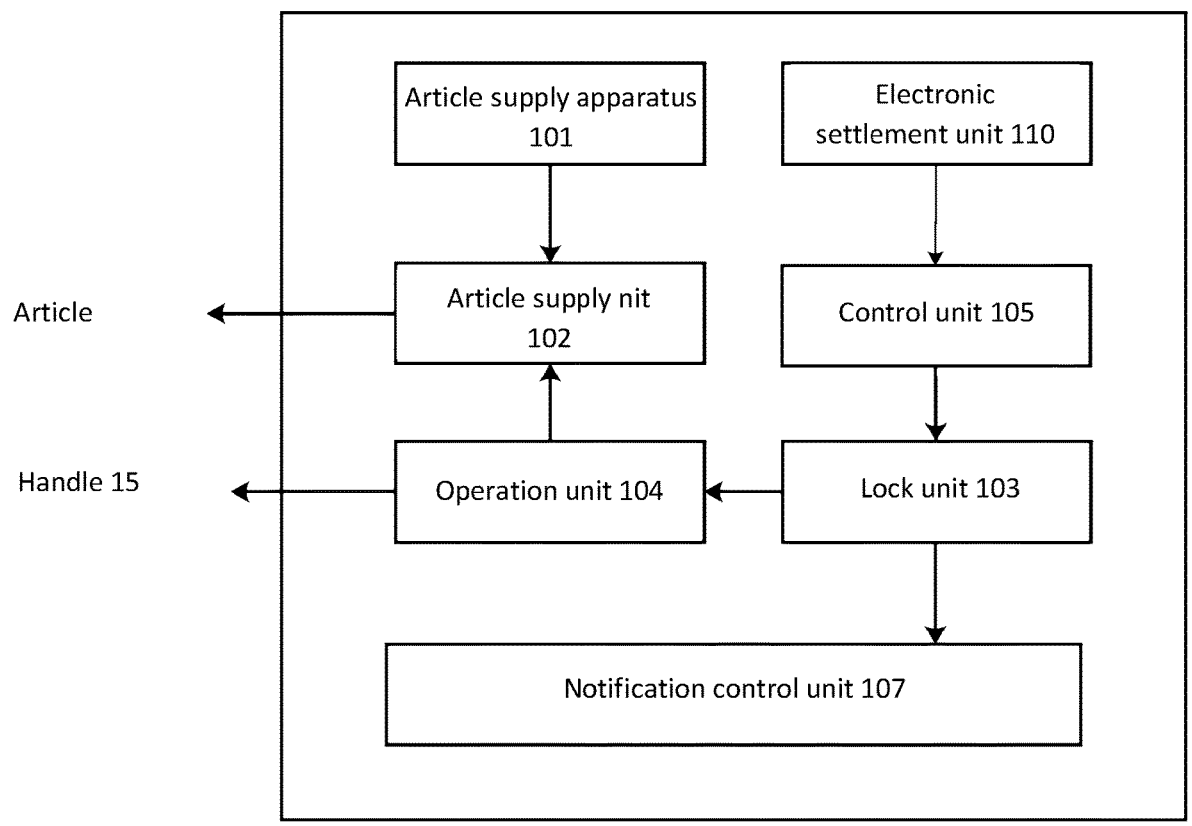
FIG. 5 is a block diagram of the article supply apparatus according to a first modified example.

In the embodiment described above, a cash settlement is exemplified. However, electronic settlement may be adopted as an embodiment. FIG. 5 is a block diagram of an article supply apparatus according to a modified example. The first modified example differs from the first embodiment in that an electronic settlement unit 110 is disposed instead of the cash reception unit 108. The electronic settlement unit 110 confirms the settlement based on communications with an electronic settlement server, which is located outside. When the electronic settlement unit 110 receives a lock release signal indicating a completion of the settlement, from the electronic settlement server, the electronic settlement unit 110 notifies the control unit 105 of it. Even in the modified example, the notification control unit 107 notifies of an operable state of the article supply apparatus by controlling blinking of the notification unit 18. and notifies of an operation completed state by controlling lighting of the notification unit 18. That is, the notification control unit 107 notifies of a state the article supply apparatus by lighting or blinking of (the light-emitting element) of the notification unit 18. By the configuration, the user can know the timing of the operation to be performed to the article supply apparatus 1. Therefore, it is possible to prevent the user from making an operation mistake at time of article supply.

Second Modified Example

In the above embodiment, the notification unit 18 is independently disposed on a front face of the article supply apparatus 1. However, in the second modified example, the notification unit 18 is integrally formed with the units other than the notification unit 18. The article supply apparatus 1 has a supply price display unit, which displays a supply price information regarding a supply price of an article. For example, the supply price display unit is configured by a transparent member, and the notification unit 18 is disposed behind the transparent member of the supply price display unit. In such configuration, when the light-emitting unit of the notification unit 18 is lighted, the light from the light-emitting unit passes through the supply price display unit so that the user can visually recognize the blinking state. Normally, when the user makes a payment of the price, since the user needs to feed cash equivalent to the price in the article supply apparatus 1, the user pays attention to the price displayed on the supply price display unit. In the second modified embodiment, a notification is performed at a portion of the article supply apparatus 1 where the user certainly pays attention so that the user easily notices the change of the state of the article supply apparatus 1, whereby it is possible for the user to perform an operation at correct timing. In addition, the notification unit 18 may be disposed near this supply price display unit.

Second Embodiment

In the embodiment described above, the configuration of the article supply apparatus which notifies of an operable state thereof (first state) and an operation completed state thereof (second state) is explained as an example. In the second embodiment, a configuration of the article supply apparatus which notifies of an operable state, an operation completed state and an authentication waiting state (third state) will be explained below. In addition, the same symbols or signs are assigned to the same elements or similar elements and detailed explanation thereof will be omitted.

Figure 6:
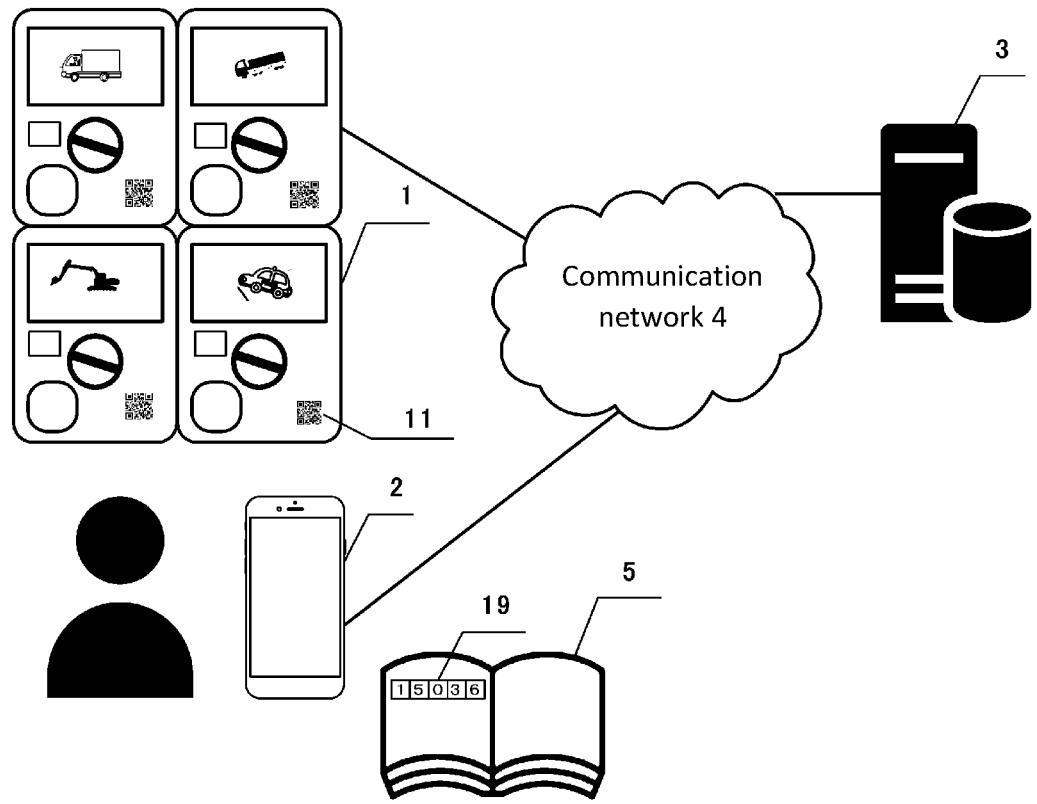
FIG. 6 is a schematic view of an article supply apparatus system according to a second embodiment.

FIG. 6 is a schematic view of an article supply apparatus system according to the present embodiment. The article supply apparatus system comprises an article supply apparatus 1, a user terminal 2 and a server 3. The article supply apparatus 1, the user terminal 2 and the server 3 are connected to a communication network 4, and communicate with one another. The communication network 4 is a communication path capable of data communication. That is, the communication line N includes a communication network, such as a telephone communication network, a cable network, the internet, etc., in addition to a LAN established by a dedicated line (dedicated cable) for direct connection or an Ethernet (REGISTERED TRADEMARK) and the like. Such a communication can be achieved by any method, and may be either wired or wireless.

Figure 7:
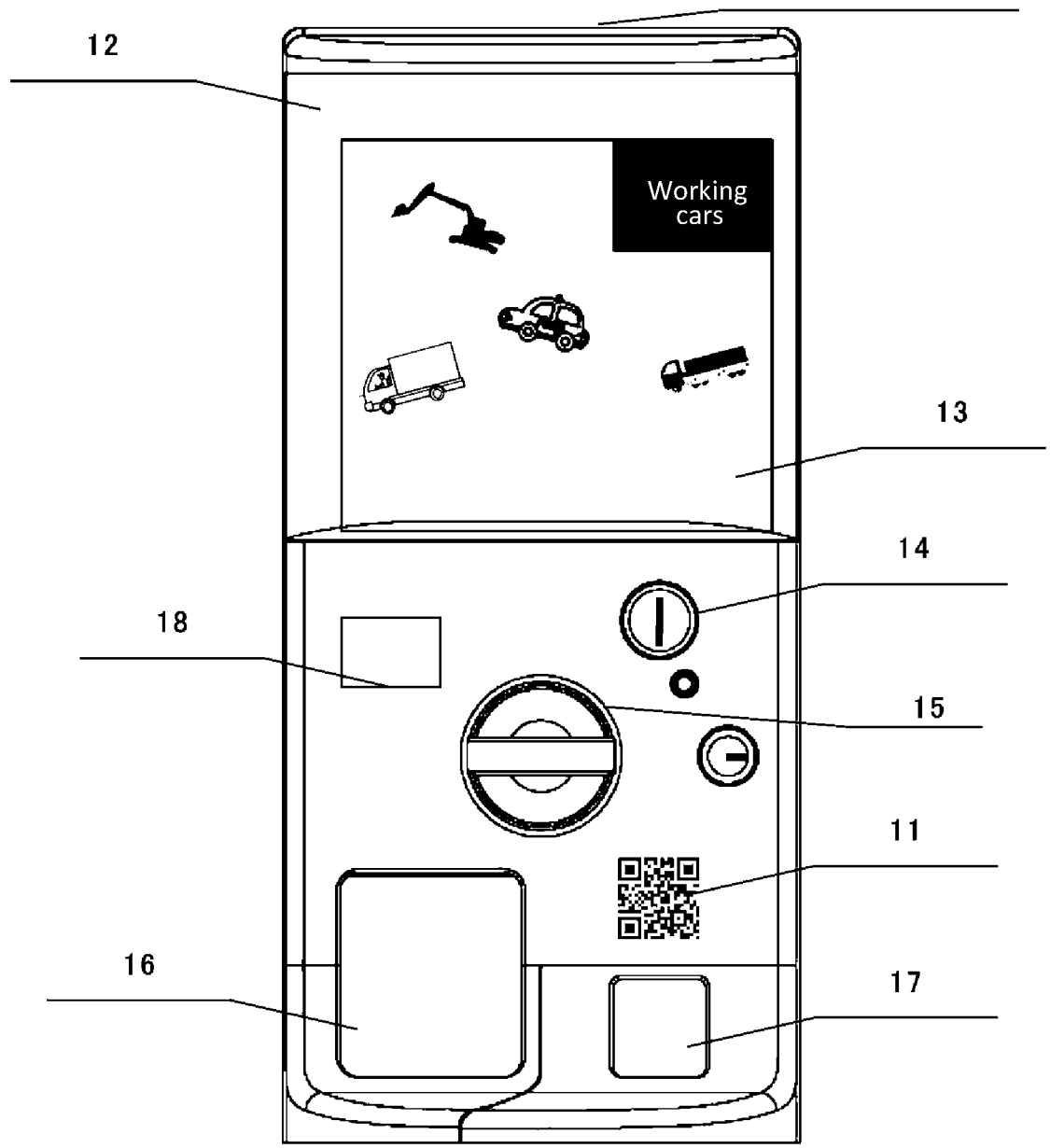
FIG. 7 is a front view of the article supply apparatus according to the present embodiment.
Figure 8:
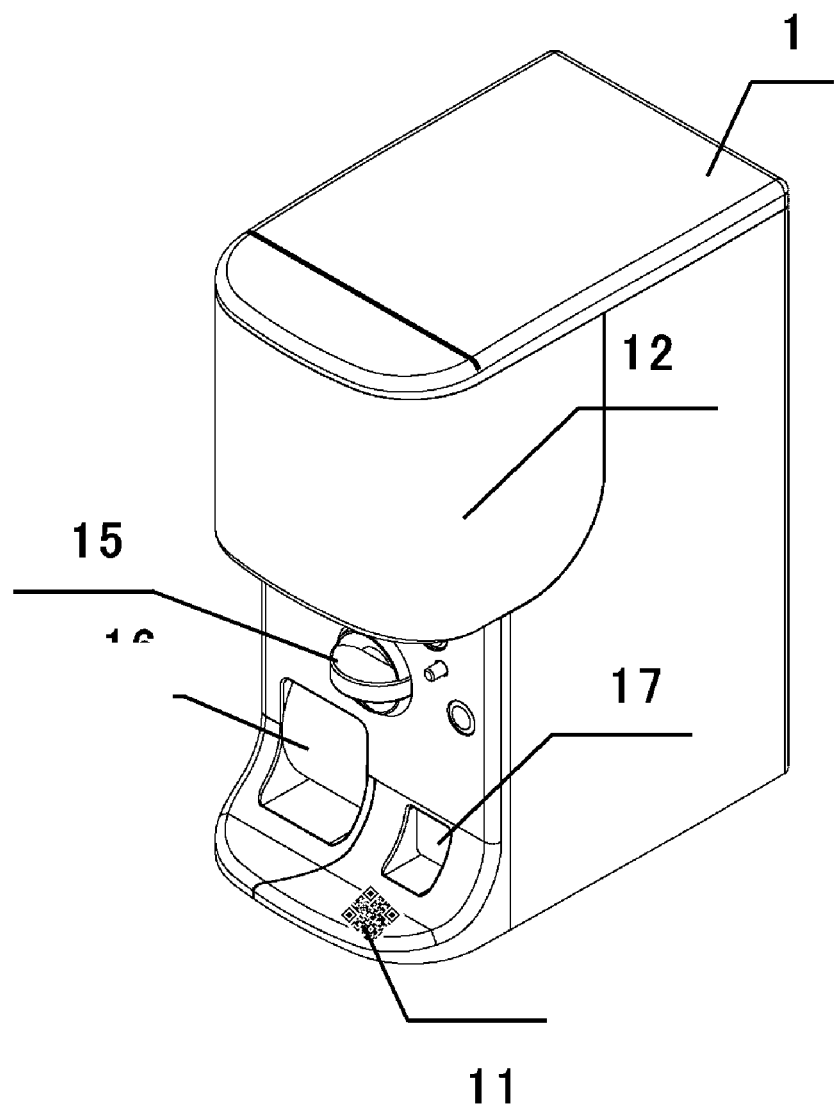
FIG. 8 is a perspective view of an example of the article supply apparatus.

The article supply apparatus 1 supplies an article to a user who bought a magazine 5. The magazine 5 is merchandise which the user bought. The magazine 5 includes a second identification information 19 (serial code) for authenticating supply of an article. The second identification information 19 is a serial code etc. which is uniquely assigned so as to be different in each piece of the magazine 5. Such a serial code is generated by using check digit etc. FIG. 7 is a front view of an example of the article supply apparatus 1 according to the present embodiment. A first identification information 11 (information display body: QR code (REGISTERED TRADEMARK) is provided on the article supply apparatus 1 in addition to the structure described as the above-described embodiments. The first identification information 11 shown on the front face of the article supply apparatus 1 includes at least article supply apparatus identification information (device ID) for identification of the article supply apparatus 1, which is uniquely assigned, and URL (Uniform Resource Locator), which is information of a link to a page for authentication of the second identification information 19. In addition to the above-described information, the first identification information 11 may includes other information such as location information for identifying an installation site of the article supply apparatus 1, information about the shop name, the price of the article, and management information required for managing the article supply apparatus 1 and the like. In addition, the way of displaying the first identification information 1, is not limited to the above-described example in which the QR code is attached, as the information display body, to a front face of the article supply apparatus 1. For example, when the article supply apparatus 1 has a display unit such as a liquid crystal display, the information display body of the first identification information 11 may be displayed on the display unit. Further, the position of displaying the first identification information 11 is not limited to the front face of the article supply apparatus 1. For example, as shown in FIG. 8, the first identification information 11 may be displayed near a portion of the return port 17 where a bottom face of the return port 17 can be visually recognized well. There is an advantage in which when a coin fed in error by a user is returned to the return port 17, the user can easily notice the returned coin by displaying the first identification information 11 at such a position. In addition, the display 13 is preferably disposed on, for example, a front face of the article accommodation unit 12, which is different from the position of the first identification information 11.

Figure 9:
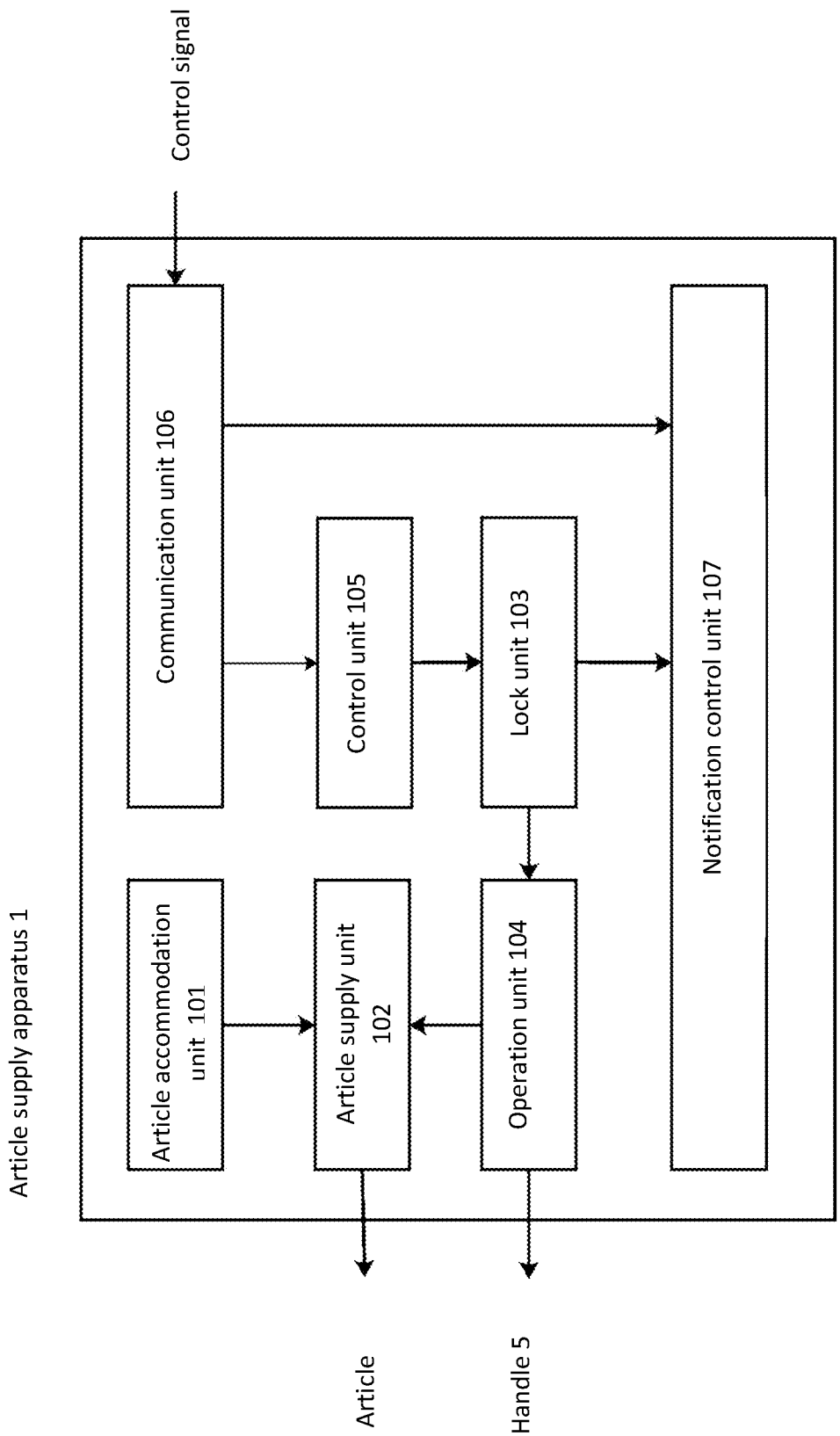
FIG. 9 is a block diagram of the article supply apparatus according to the second embodiment.

FIG. 9 is a block diagram of the article supply apparatus 1 according to the present embodiment. The article supply apparatus 1 has a communication unit 106 in addition to the structure described above as the embodiments. The communication unit 106 can communicate with the server 3 via the communication network 4. The communication unit 106 receives a variety of control signals from the server 3.

The control unit 105 receives a lock release signal sent when the authentication of the serial code (which is the second identification information 19) is completed in the server 3, the control unit 105 releases the lock of the lock unit 103. The lock release signal is sent from the server 3 to the article supply apparatus 1 identified based on the first identification information displayed on the article supply apparatus 1.

The notification control unit 107 notifies of an operable state (first state), an operation completed state (second state), or an authentication waiting state (third state) as a state of the article notification state 1 by controlling the notification unit 18. When the notification control unit 107 receives a notification that a lock by the lock unit 103 is released, the notification control unit 107 controls the notification unit 18 to notify of an operable state. Because receipt of the lock release signal means that a serial code has been authenticated, it can be said that the notification control unit 107 notifies of the operable state by controlling the notification unit 18 on condition that the serial code is authenticated. When a lock operation is performed by the lock unit 103, the notification control unit 107 notifies of an operation completed state by controlling the notification unit 18. When the notification control unit 107 receives an authentication progressing signal from the server 3 through the communication unit 106, the notification control unit 107 notifies of the authentication waiting state by controlling the notification unit 18. The notification control unit 107 performs a notification in the authentication waiting state by blinking the light-emitting element of the notification unit 18 at a predetermined interval. In the notification method of the authentication waiting state, a notification is performed at a first blinking speed. In the operable state, a notification is performed at a second blinking speed. In the present embodiment, the first blinking speed is slower than the second blinking speed. However, the embodiment is not limited thereto as far as the first blinking speed is different from the second blinking speed.

Figure 10:
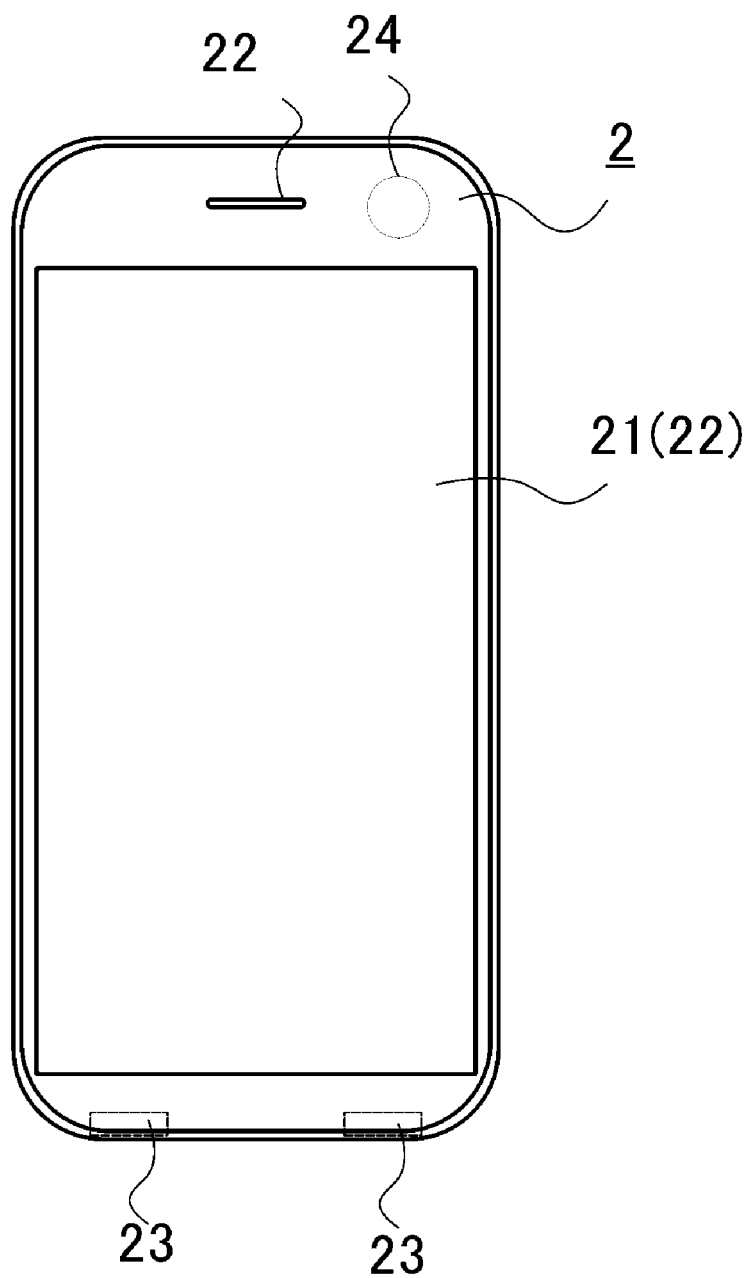
FIG. 10 shows an example of a terminal according to the second embodiment.

The terminal 2 is, for example, a personal computer, a tablet type computer, a smart phone, a cell phone or the like. FIG. 10 is a diagram showing a configuration example of the smart phone as an example of the terminal 2 according to the second embodiment. As shown in FIG. 10, the terminal 2 comprises a display 21, a touch operation panel 22 integrally formed with the display 21, a built-in speaker 23 and a camera 24. In addition, a control board (not shown), a built-in battery, s power button, a sound volume adjusting button and the like are disposed in the terminal 2. On the control board, various microprocessor(s), such as a CPU, a GPU, a DSP, etc., various IC memories, such as an ASIC, a VRAM, a RAM, a ROM, a wireless communication module for wirelessly communicating with a mobile phone base station and the like are mounted. Further, on the control board, a so-called I/F circuit (interface circuit), such as a driver circuit for the touch operation panel 32, etc., are mounted. These elements mounted on the control board are electrically connected with one another via a bus circuit etc., and are connected so as to be able to read and write data, and to transmit and receive signals.

Figure 11:
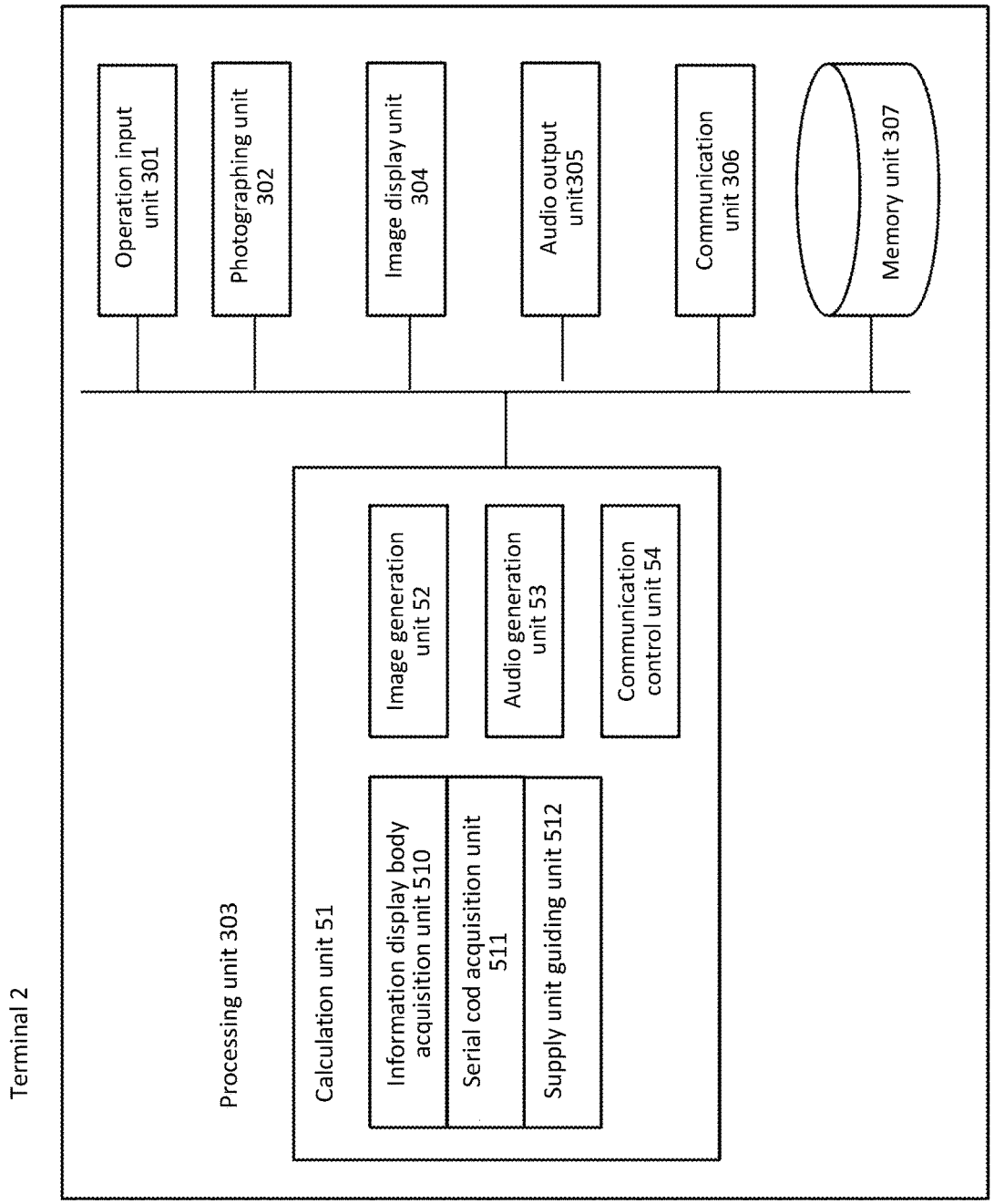
FIG. 11 is a block diagram of the terminal according to the second embodiment.

FIG. 11 is a block diagram showing a functional structure example of the terminal 2 according to the second embodiment. As shown in FIG. 11, the terminal 2 includes an operation input unit 301, a photographing unit 302, a processing unit 303, an image display unit 304, an audio output unit 305, a communication unit 306 and a memory unit 307.

The operation input unit 301 is provided to receive inputs of various operations performed by a user. The operation input unit 301 outputs operation input signals which correspond to the operation inputs, to the processing unit 303. Functions of the operation input unit 301 can be achieved by an element directly manipulated by a finger of the user, such as a touch operation pad, a home button, a button switch, a joystick, a trackball, etc. Functions of the operation input unit 301 can also be achieved by an element, which detects motion or posture, such as an acceleration sensor, an angular velocity sensor, an inclination sensor, and a geomagnetic sensor, etc. In FIG. 10, the touch operation panel 22 corresponds thereto.

The photographing unit 302 performs imaging processing of the image display body (QR code) of the first identification information 11, and outputs the captured image to the processing unit 303. The photographing unit 302 includes a lens, an image pick-up device and a controller which controls these operations. In FIG. 10, a camera corresponds to these elements.

The processing unit 303 integrally controls operations of the terminal 2 based on a program and data stored in the memory unit 307, operation input signals from the operation input unit 301, and the like. Functions of the processing unit 303 can be achieved by, for example, a microprocessor, such as a CPU, a GPU, etc., and electronic components such as an ASIC and an IC memory etc. The processing unit 303 includes, as main functional units, a calculating unit 51, an image generation unit 52, and an audio generation unit 53 and a communication control unit 54.

The calculation unit 51 outputs calculated results to the image generation unit 52, the audio generation unit 53 and the communication control unit 54. The calculation unit 51 includes an information display body acquisition unit 510, a serial code acquisition unit 511 and a supply information guiding unit 512. The information display body acquisition unit 510 reads the information display body of the article supply apparatus 1, which is captured by the photographing unit 302 and acquires the first identification information 11 therefrom.

The serial code acquisition unit 511 sends a request for transmission of an input screen for a serial code including the acquired device ID, based on the first identification information 11 acquired by the information identification acquisition unit 510. In this embodiment, the destination (a link destination) of the request is the server 3. The serial code acquisition unit 511 receives the input screen of the serial code, and causes the image display unit 304 to display the input screen for the serial code through the image generation unit 52.

The supply information guiding unit 512 causes the image display unit 304 to display a result of an authentication of the serial code by the server 3, a guidance about supply of an article, and a guidance about an error (un-suppliable case) through the image generation unit 52.

Functions of the information display body acquisition unit 510, the serial code acquisition unit 511 and the supply information guiding unit 512 can be achieved by a web browser installed in the terminal 2 or by an application dedicated therefor.

The image generation unit 52 generates one image screen per one frame time (for example, 1/60 second) based on a processing result of the calculation unit 51, and outputs the generated image signal to the image displaying unit 304. Functions of the image generation unit 52 can be realized by, for example, a processor, such as a GPU, digital signal processor (DSP) etc., a video signal IC, a program for video codec etc., an IC memory for drawing frames such as a frame buffer etc., and an IC memory which is used for texture data development and the like.

Based on a processing result of the calculating unit 51, the audio generation unit 53 generates audio signals for sound effects and various operation sounds or the like, and outputs these audio signals to the audio output unit 305. Functions of the audio generation unit 53 can be realized by, for example, a processor such as a digital signal processor (DSP), an audio synthesis IC, etc., and an audio codec capable of reproducing an audio file and the like. The communication control unit 54 performs processing for communication connection with the server 3 etc. for data communication, and data processing.

The image display unit 304 displays a screen image based on an image signal inputted from the image generation unit 52. For example, functions of the image display unit 403 can be realized by a display device, such as a flat panel display, a cathode ray tube (CRT), a projector, a head-mounted display, etc. In FIG. 10, the image display unit 304 corresponds to the display 21.

The audio output unit 305 outputs sounds such as sound effects or the like, based on an audio signal inputted from the audio generation unit 53. In FIG. 10, the audio output unit 305 corresponds to the speaker 23.

The communication unit 306 achieves communication by connecting with the communication line N. Functions of the communication unit 306 can be realized by, for example, a wireless communication device, a modem, a TA (terminal adapter), a jack and a control circuit of a communication cable for wired communication, and the like.

In the memory unit 307, programs for causing the terminal 2 to work therewith and for realizing various functions provided in the terminal 2, and data etc. used during running of the programs are stored in advance, or such programs and data are temporarily stored every time each processing is performed. The memory unit 307 can be realized by, for example, an IC memory, such as a RAM, a ROM, a flash memory, etc., a magnetic disk such as a hard disk, etc., or an optical disc, such as a CD-ROM, a DVD, etc. In the memory unit 307, a system program and a control program are stored. The system program realizes a basic function of the terminal 2 as a computer. The control program functions as the calculating unit 51 of the processing unit 31 (the information display body acquisition unit 510, the serial code acquisition unit 511 and the supply information guiding unit 512).

Figure 12:
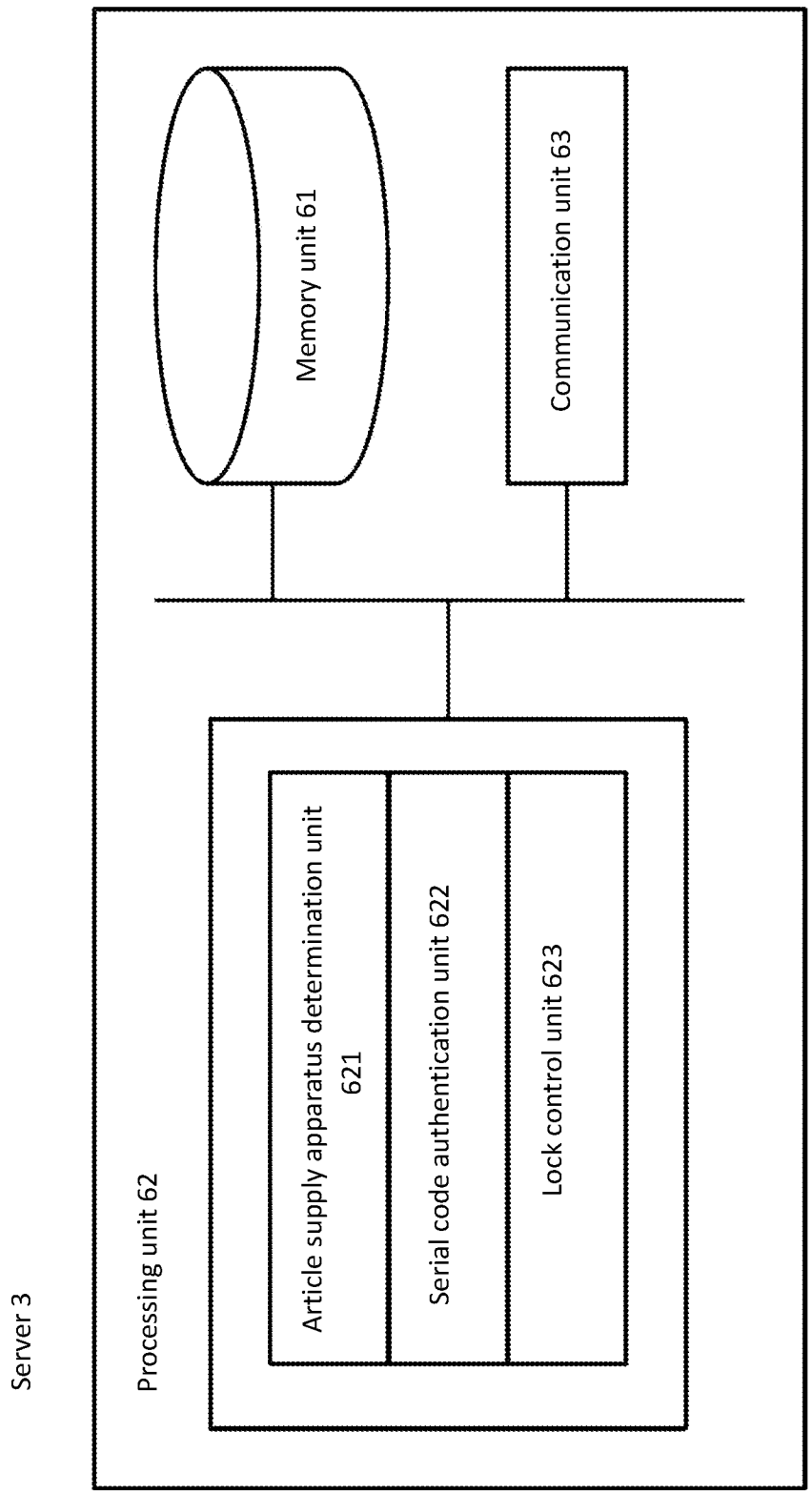
FIG. 12 is a block diagram of a server according to the second embodiment.

The server 3 is a server system comprising a single or two or more server apparatuses and a memory device(s) etc. The server 3 performs the authentication processing etc. FIG. 12 shows an example of a functional configuration of the server 3. The server 3 comprises a memory unit 61, a processing unit 62 and a communication unit 63.

The memory unit 61 can be realized by, for example, an IC memory, such as a RAM, a ROM, a flash memory, etc., a magnetic disk such as a hard disk, etc., or an optical disc, such as a CD-ROM, a DVD, etc., and a system program and functional programs are stored therein. The system program realizes basic functions as a computer. The functional program causes the processing unit 62 to function as an article supply apparatus determination unit 621, a serial code authentication unit 622 and a lock control section 623, which are described below. In addition, article supply apparatus data D1 and serial code data D2 are stored in the memory unit 61. The article supply apparatus data D1 and the serial code data D2 will be described later.

The article supply apparatus data D1 includes device IDs of article supply apparatuses 1, stock quantity of the articles, which are accommodated in each of the article supply apparatuses 1. FIG. 13 is a diagram showing an example of the article supply apparatus data D1. As shown in FIG. 13, in the article supply apparatus data D1, each of the device IDs for the article supply apparatuses 1 and the stock quantity of the articles accommodated in each of the article supply apparatus having the device ID are associated with each other.

The serial code data 2 includes a serial code, which is printed on the magazine 5. The serial code includes a number (information), which is uniquely assigned to each magazine 5 so that the numbers, which are assigned to the respective magazines 5 do not overlap with one another. Such a serial code can be generated by using check digit etc. FIG. 14 is a diagram showing an example of the serial code data D2. As shown in FIG. 14, in the serial code data D2, a unique serial code is associated with an authentication completed flag. As described below, when the serial code authentication unit 622 authenticates an article acquisition right of a user and the article supply apparatus 1 completes a supply of an article, an authentication completed flag, which indicates that the authentication has been completed is added to a field of the authentication completed flag of the serial code.

The processing unit 62 controls the operation of the server 3 based on the program and data stored in the memory unit 61. Functions of the processing unit 62 can be achieved by, for example, a microprocessor, such as a CPU, a GPU, etc., and electronic components such as an ASIC and an IC memory etc. The processing unit 62 includes the article supply apparatus determination unit 621, the serial code authentication unit 622 and the lock control section 623 as main function parts.

The article supply apparatus determination unit 621 receives a request for an input screen of a serial code from the terminal 2, acquires the device ID included in the request, and determines whether or not the acquired device ID is included in the article supply apparatus data D1. When the acquired device ID is included in the article supply apparatus data D1, the article supply apparatus determination unit 621 checks the stock quantity of the article accommodated in the article supply apparatus 1 to which the device ID is assigned. When articles in the stock are available, the article supply apparatus determination unit 621 determines that the article supply apparatus 1 having the device ID the user acquires, is capable of supplying articles. And the article supply apparatus determination unit 621 identifies the article supply apparatus 1 which is a destination of the lock release signal. When the determination and identification thereof is completed, the article supply apparatus determination unit 621 transmits an input screen for the serial code to the terminal 2. In addition, the article supply apparatus determination unit 621 transmits an authentication progressing signal indicating that the article supply apparatus determination unit 621 starts authentication processing of the serial code, to the identified article supply apparatus 1. On the other hand, the article supply apparatus determination unit 621 transmits, to the terminal 2, an error screen (information) indicating that no article can be supplied when the acquired device ID is not included in the article supply apparatus data D1, or when no article is in the stock even if the acquired device ID is included in the article supply apparatus data D1. In addition, a period capable of supplying an article, during which an article can be supplied from the article supply apparatus 1 is determined in advance. When the article supply apparatus determination unit 621 receives a request for the input screen for a serial code from the terminal 2 after the period capable of supplying an article lapses, the article supply apparatus determination unit 621 transmits, to the terminal 2, the error screen (information) indicating that no article can be supplied.

The serial code authentication unit 622 refers to the serial code inputted in the input screen and serial codes of the serial code data D2. When the serial code inputted in the input screen is included in the serial code data D2 and an authentication flag for the serial code is not set, the serial code inputted in the input screen deems to be authenticated. And guide information about a supply of an article is sent to the terminal 2 of the user. In addition, the serial code authentication unit 622 authenticates an expiration date of the serial code inputted in the input screen when the expiration date is set for the inputted serial code. On the other hand, the serial code authentication unit 622 transmits, to the terminal 2, an error screen indicating that the serial code could not be authenticated when the serial code could not be authenticated (including case where authentication cannot be performed since the expiration period is expired).

The lock control section 623 transmits a lock release signal to the article supply apparatus 1 to which the acquired device ID is assigned, when the article supply apparatus determination unit 621 determines that the article supply apparatus 1 to which the acquired device ID is assigned can supply an article and the serial code is authenticated by the serial code authentication unit 622.

(Operation)

Figure 15:
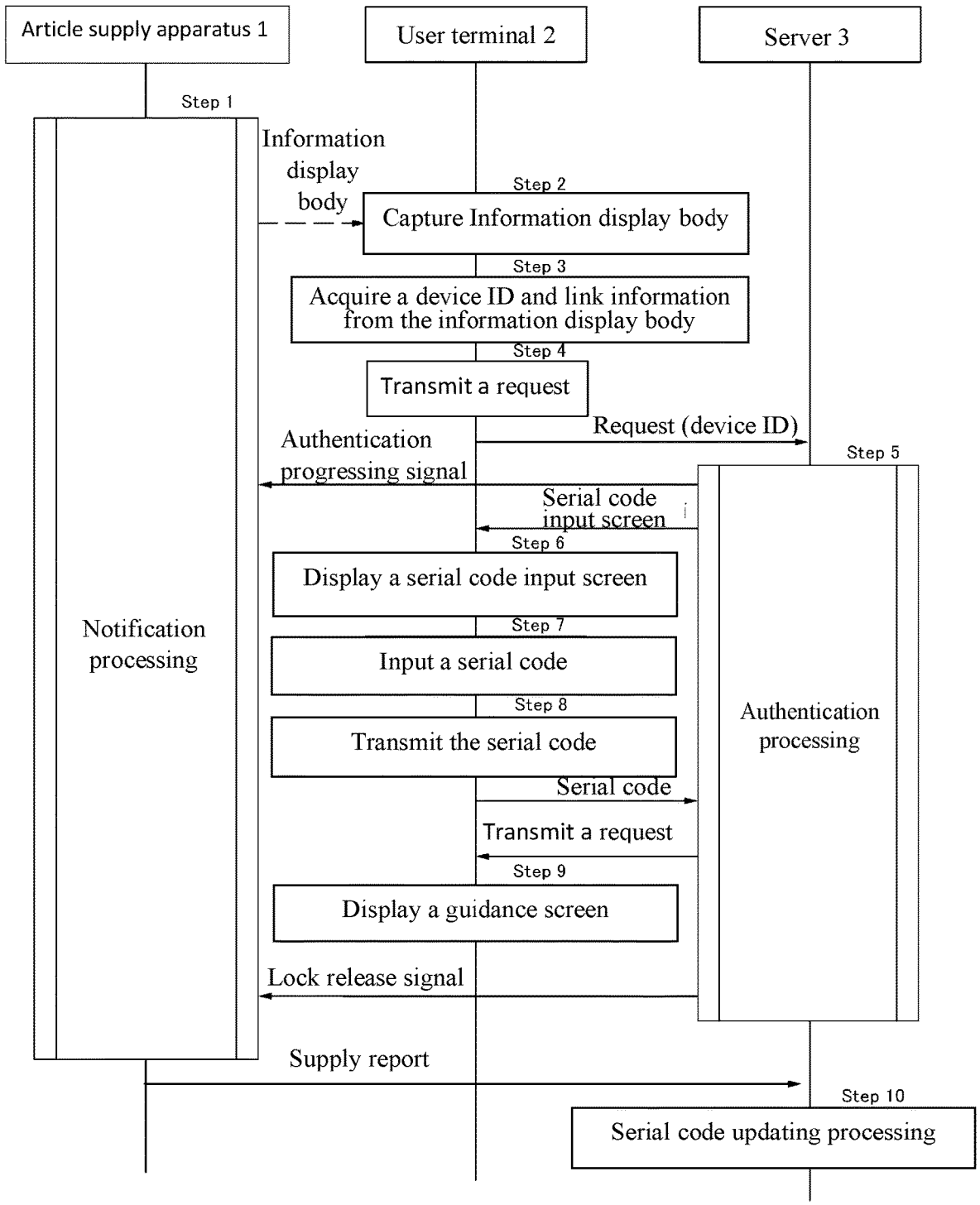
FIG. 15 is a sequence diagram illustrating an operation of the article supply apparatus system according to the second embodiment.
Figure 16:
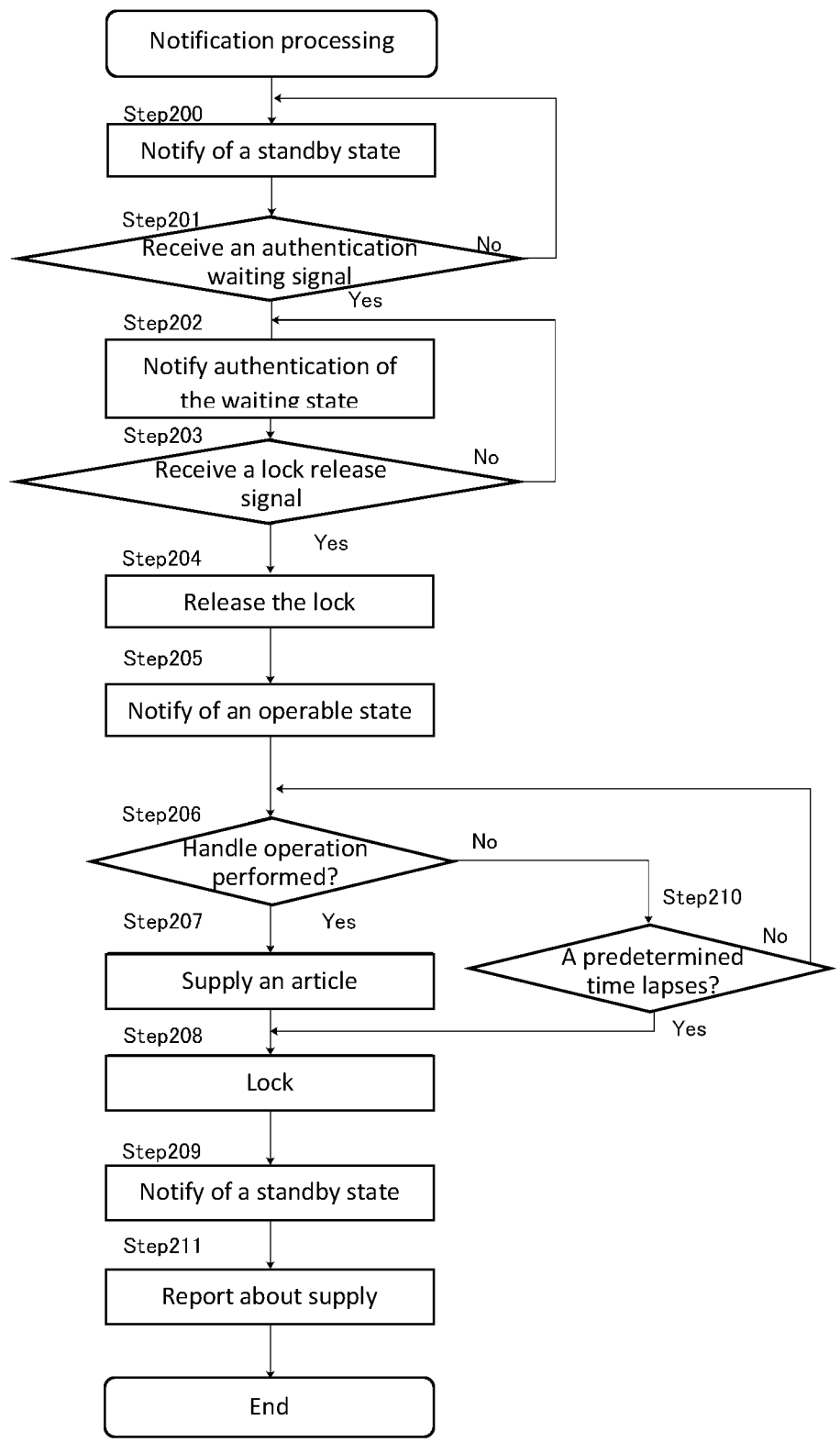
FIG. 16 is a flowchart illustrating an operation of the article supply apparatus according to the second embodiment.

An operation of an article supply system according to the present embodiment will be described below. FIG. 15 is a sequence diagram illustrating an operation of the article supply system according to the present embodiment. FIG. 16 is a flow chart illustrating an operation of the article supply apparatus 1 according to the present embodiment. First, an operation of the article supply apparatus system will be explained, referring to FIG. 15.

The article supply apparatus 1 performs notification processing (Step 1). Details of the notification processing (Step 1) will be described later.

Figure 17:
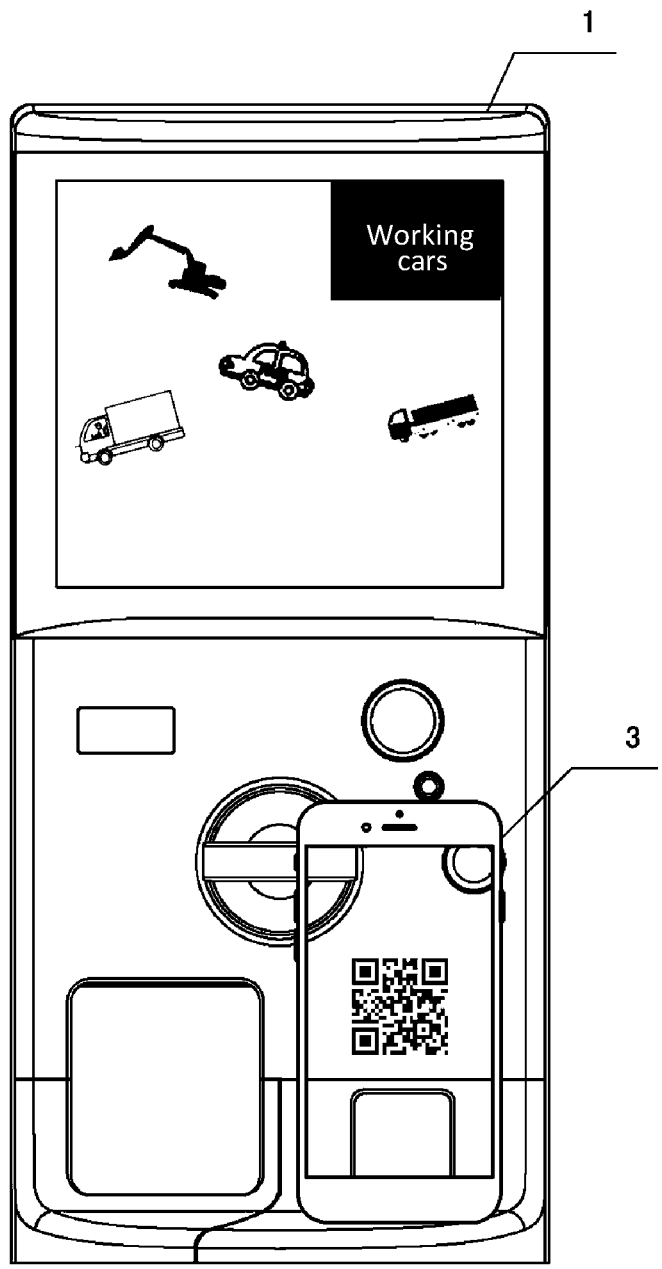
FIG. 17 show a situation at a photographing time of an information display body.

A user goes to a site where an article supply apparatus 1 is installed, and acquires an information display body of the first identification information 11 which is displayed on the article supply apparatus 1. The acquisition of the information display body is performed by using an image capture function of the photographing unit 302 of the terminal 2 (Step 2). FIG. 17 show a situation where an image of the information display body of the first identification information 11 of the article supply apparatus 1 is captured by the photographing unit 302 of the terminal 2. The user stands up in front of the article supply apparatus 1, operates the terminal 2 so that the information display body including the first identification information 11 is shown on the display 31 of the terminal 2 and photographs the information display body.

The information display body acquisition unit 510 of the terminal 2 acquires the first identification information 11 from the photographed information display body including the first identification information 11. In this embodiment, the acquired first identification information 11 includes the device ID of the article supply apparatus 1 and information of a link (URL) to a means for authenticating the serial code 12 (Step 3). In this embodiment, the acquired device ID is "12560" and the link to the server 3 is set.

The serial code acquisition unit 511 of the terminal 2 transmits, to the server 3, a request for transmission of an input screen (image, data, information etc.) of the serial code, based on the link, including the device ID of the article supply apparatus 1 (Step 4).

Figure 18:
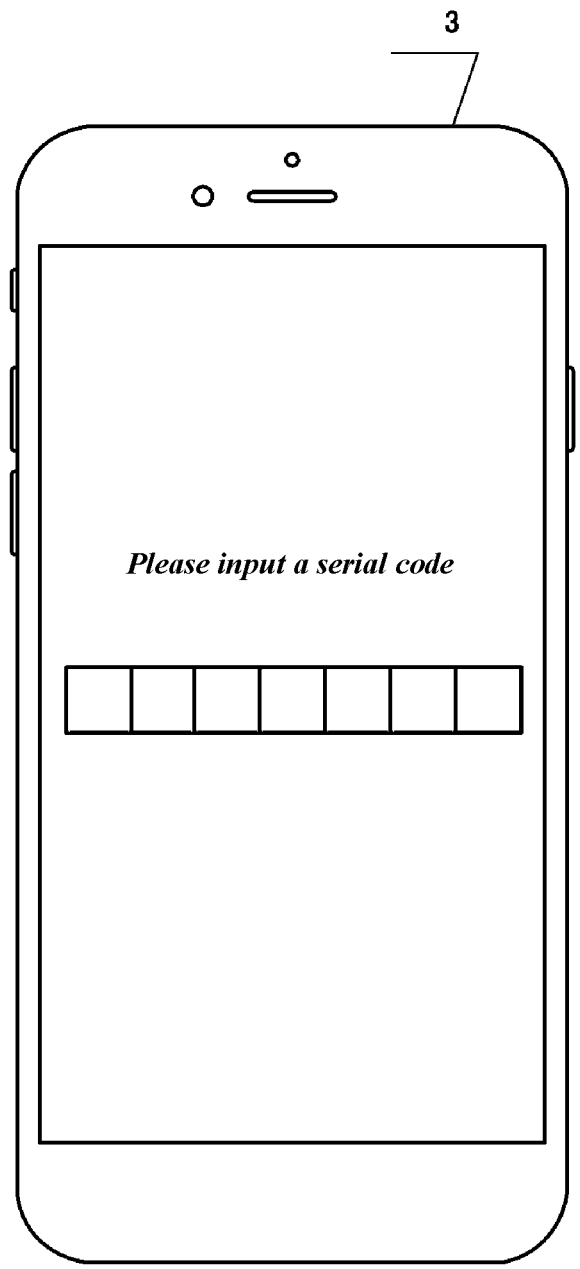
FIG. 18 shows an example of a serial code input screen displayed on the terminal.

The server 3 receives a request from the terminal 2 and performs authentication processing (Step 5). When the server 3 starts the authentication processing, the server 3 transmits an authentication progressing signal to the article supply apparatus 1. Details of the authentication processing will be explained later. When the terminal 2 receives a serial code input screen without receiving an error guiding screen from the server 3, the serial code acquisition unit 511 of the terminal 2 displays a serial code input screen (Step 6). FIG. 18 shows an example of the serial code input screen displayed on the terminal 2. The user inputs the serial code, following a written guidance information about an input of serial" code, which is shown in the displayed input screen (Step 7). In the present embodiment, the user inputs the serial code, 1VB3588, in the serial code input screen. And the serial code acquisition unit 511 transmits the serial code to the server 3 (Step 8).

The server 3 receives the serial code and performs the authentication processing (Step 5). The server 3 transmits a guidance information to the terminal 2 when the serial code is authenticated. In addition, the server 3 transmits a lock release signal to the article supply apparatus 1 when the article supply apparatus 1 is identified and the serial code can be authenticated.

Figure 19:
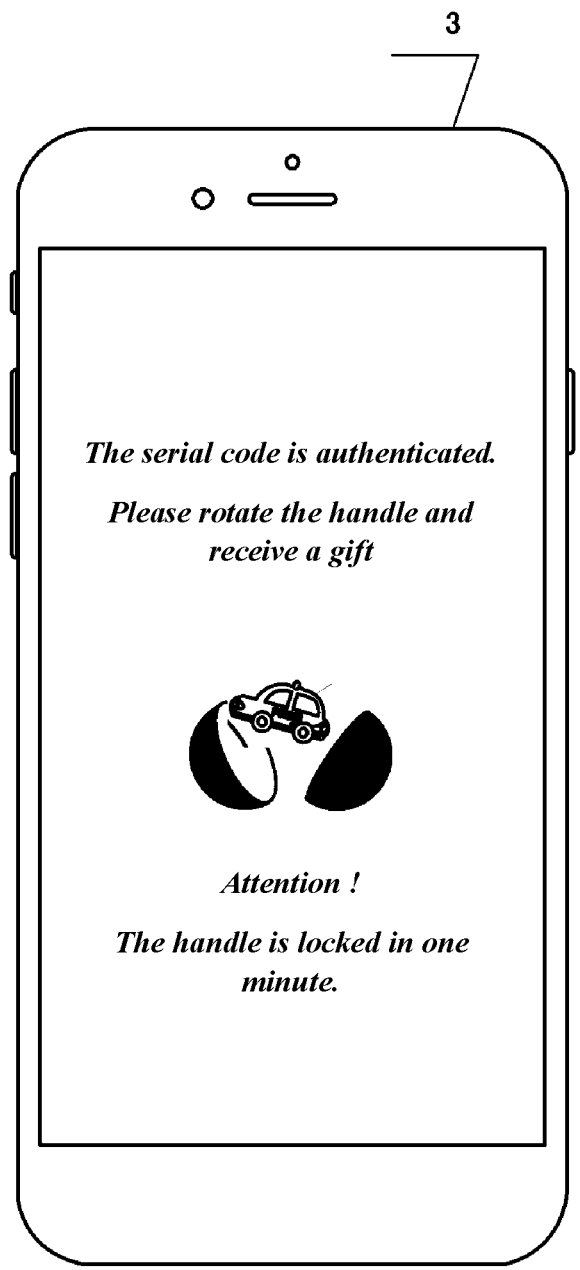
FIG. 19 shows an example of guidance information displayed on the terminal.

The supply information guiding unit 512 of the terminal 2 receives the guidance information from the server 3, and displays the guidance information (Step 9). FIG. 19 shows an example of the guidance information displayed on the terminal 2. The guidance information shown in FIG. 19, indicates that the serial code is authenticated, that the user can receive an article by performing an operation to the handle 15 of the article supply apparatus 1, and that the handle 15 will be locked in one minute. The user performs an operation to the article supply apparatus 1 according to the guidance information.

When the user performs an operation to the operation unit 104, the article supply apparatus 1 transmits a report regarding the supply to the server 3.

The serial code authentication unit 622 of the server 3 receives the report about the article supply. When the report about the article supply indicates that an article is supplied in a normal matter, the serial code authentication unit 622 adds an authentication completed flag, which indicates that the authentication has been completed, to a field of the authentication flag of the corresponding serial code in the serial code data D2, and makes the serial code un-reusable (Step 10). In addition, the server 3 subtracts one (1) from the number of articles in the stock of the article supply apparatus 1 which transmits the report about the article supply. As described above, the entire operation is explained.

Figure 20:
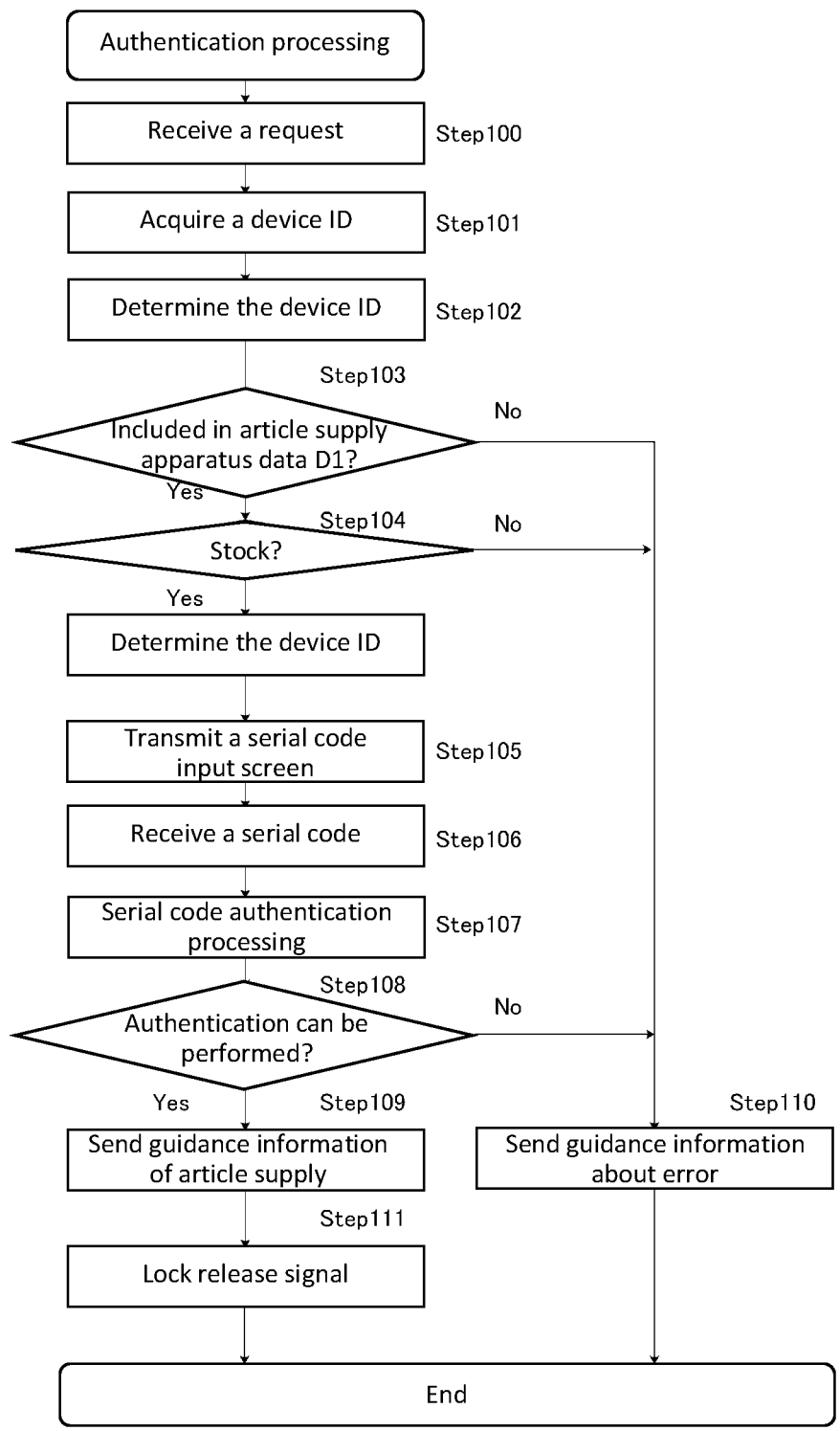
FIG. 20 is a flowchart illustrating an operation of a server.

Next, the authentication processing performed by the server 3 (Step 5) is explained referring to a flowchart shown in FIG. 20. When the article supply apparatus determination unit 621 of the server 3 receives a request from the terminal 2 (Step 100), the article supply apparatus determination unit 621 acquires the device ID included in the request (Step 101). In this embodiment, the acquired device ID is 12560.

Figure 21:
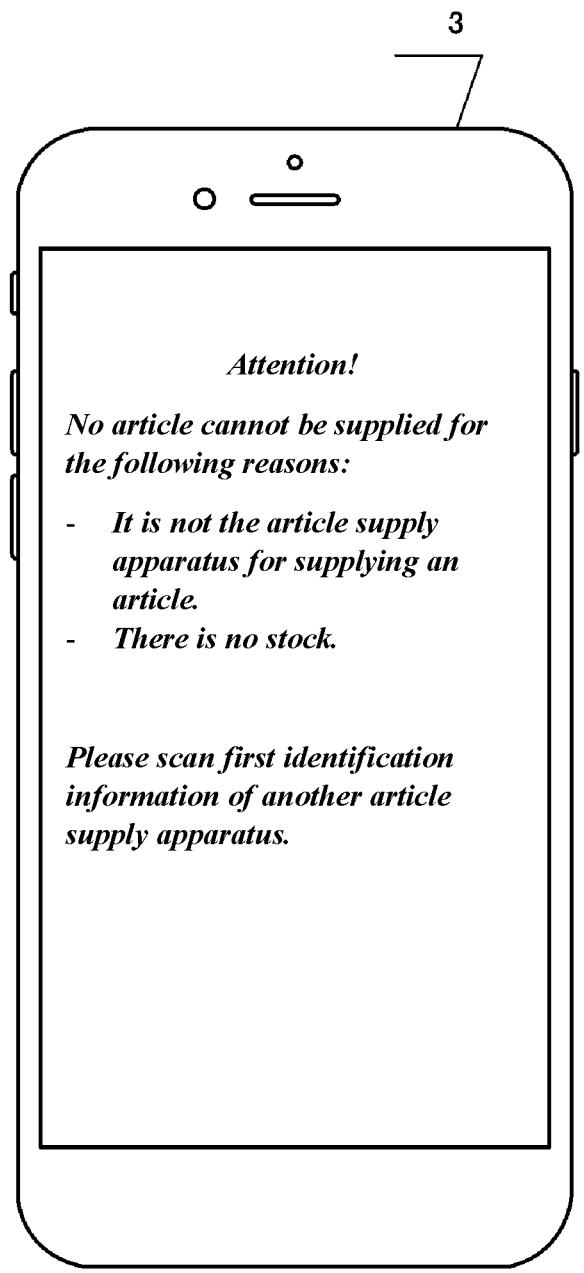
FIG. 21 is a diagram showing an example of guidance information about an error of the article supply apparatus displayed on the terminal.

The article supply apparatus determination unit 621 determines the device ID using the article supply apparatus data D1 (Step 102). In the determination of the device ID, it is determined whether or not the acquired ID is included in the article supply apparatus data D1. When the acquired device ID is included in the article supply apparatus data D1 (Yes in Step 103), the article supply apparatus determination unit 621 determines that the article supply apparatus 1, to which the device ID acquired by the user is assigned, is an article supply apparatus from which an article in collaboration with the magazine 5 (magazine collaboration item) can be supplied. On the other hand, when the acquired device ID is not included in the article supply apparatus data D1 (No in Step 103), the article supply apparatus determination unit 621 determines that the article supply apparatus 1, to which the device ID acquired by the user is assigned, is not an article supply apparatus from which an article in collaboration with the magazine 5 (magazine collaboration item) can be supplied, and thereby transmits guidance information for an error of the article supply apparatus, to the terminal 2 (Step 110). FIG. 21 is a diagram showing an example of the error guidance information.

In this embodiment, since the acquired device ID of the article supply apparatus 1 is 12560, which is included in the article supply apparatus data D1, the article supply apparatus determination unit 621 determines that the article supply apparatus 1, to which 12560 is assigned as the device ID, is an article supply apparatus 1 capable of supplying an article in collaboration with the magazine 5.

Next, the article supply apparatus determination unit 621 checks if there is a stock of articles in the article supply apparatus 1 to which the device ID is assigned (Step 104). When the stock quantity corresponding to the acquired device ID in the article supply apparatus data D1 is not zero (0), the article supply apparatus determination unit 621 determines that the article supply apparatus 1 to which the acquired device ID is assigned can supply an article, and transmits an authentication progressing signal to the article supply apparatus 1 (Step 105). The article supply apparatus determination unit 621 transmits an input screen (image, data, information thereof etc.) of the serial code to the terminal 2 (Step 106). On the other hand, when the stock quantity corresponding to the acquired device ID in the article supply apparatus data D1 is zero (0) (No in Step 104), the article supply apparatus determination unit 621 transmits the error guidance information to the terminal 2 (Step 110). For example, the error guidance information shown in FIG. 21 is transmitted to the terminal 2.

In this embodiment, since the stock quantity corresponding to the acquired device ID: 12560 in the article supply apparatus data D1 is not zero (0) (Yes in Step 104), the article supply apparatus determination unit 621 transmits an input screen (image, data, information thereof etc.) for the serial code to the terminal 2 (Step 106).

Next, when the serial code authentication unit 622 receives the serial code inputted in the input screen (Step 107), authentication processing of the acquired serial code is performed (Step 108). In this embodiment, the acquired serial code is 1VB3588, and the serial code 1VB3588 is an object to be authenticated.

The serial code authentication unit 622 compares the acquired serial code with serial codes in the serial code data D2. When the acquired serial code is included in the serial code data D2 and an authentication completed flag is not set for the serial code, the serial code authentication unit 622 determines that the acquired serial code is authenticated (Step 109). In addition, the serial code authentication unit 622 performs authentication of an expiration date of the serial code inputted in the input screen if the expiration date is set for the serial code. The serial code authentication unit 622 transmits the guidance information regarding supply of an article when the expiration date for the serial code is valid and the serial code is authenticated (Step 112).

Figure 22:
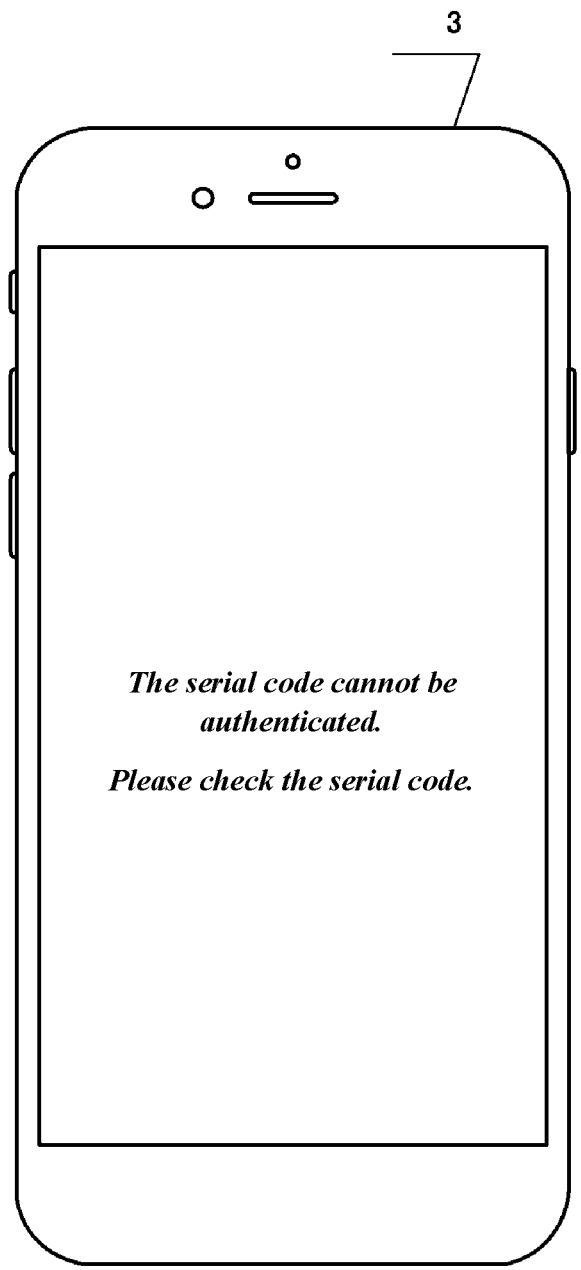
FIG. 22 shows an example of an error screen for indicating that the serial code cannot be authenticated.

On the other hand, the serial code authentication unit 622 compares the acquired serial code with serial codes in the serial code data D2. When the acquired serial code is not included in the serial code data D2 or when an authentication completed flag is set for the serial code even if the acquired serial code is included in the serial code date D2, or validity of the serial code is expired when the expiration date is set for the serial code, the serial code authentication unit 622 determines that the acquired serial code is inappropriate so that no authentication is performed. When the authentication of the serial code cannot be performed by the serial code authentication unit 622 (including the case where the authentication cannot be performed because validity of the serial code is expired), the serial code authentication unit 622 transmits, to the terminal 2, an error screen indicating that the serial code could not be authenticated (Step 112). FIG. 22 shows an example of the error screen for indicating that the serial code cannot be authenticated. The error screen includes information for providing an explanation to the user about details of errors such as causes of error, coming operations and the like.

In this embodiment, the acquired serial code is 1VB3588, and included in the serial code data D2, and an authentication completed flag is not set therefor. In addition, no expiration date is set therefor. Therefore, the serial code authentication unit 622 determines that the acquired serial code 1VB3588 is authenticated, and transmits a guidance information regarding supply of an article.

When the article supply apparatus determination unit 621 determines that the article supply apparatus 1 to which the device ID is assigned can supply, and the serial code is authenticated by the serial code authentication unit 622, the lock control section 623 transmits a lock release signal to the article supply apparatus 1 having the device ID which is identified by the article supply apparatus determination unit 621 (Step 111). In this embodiment, the lock control section 623 transmits the lock release signal to the article supply apparatus 1 to which 12560 is assigned as the device ID. Thus, the authentication processing of the server 3 is explained above.

Figure 23:
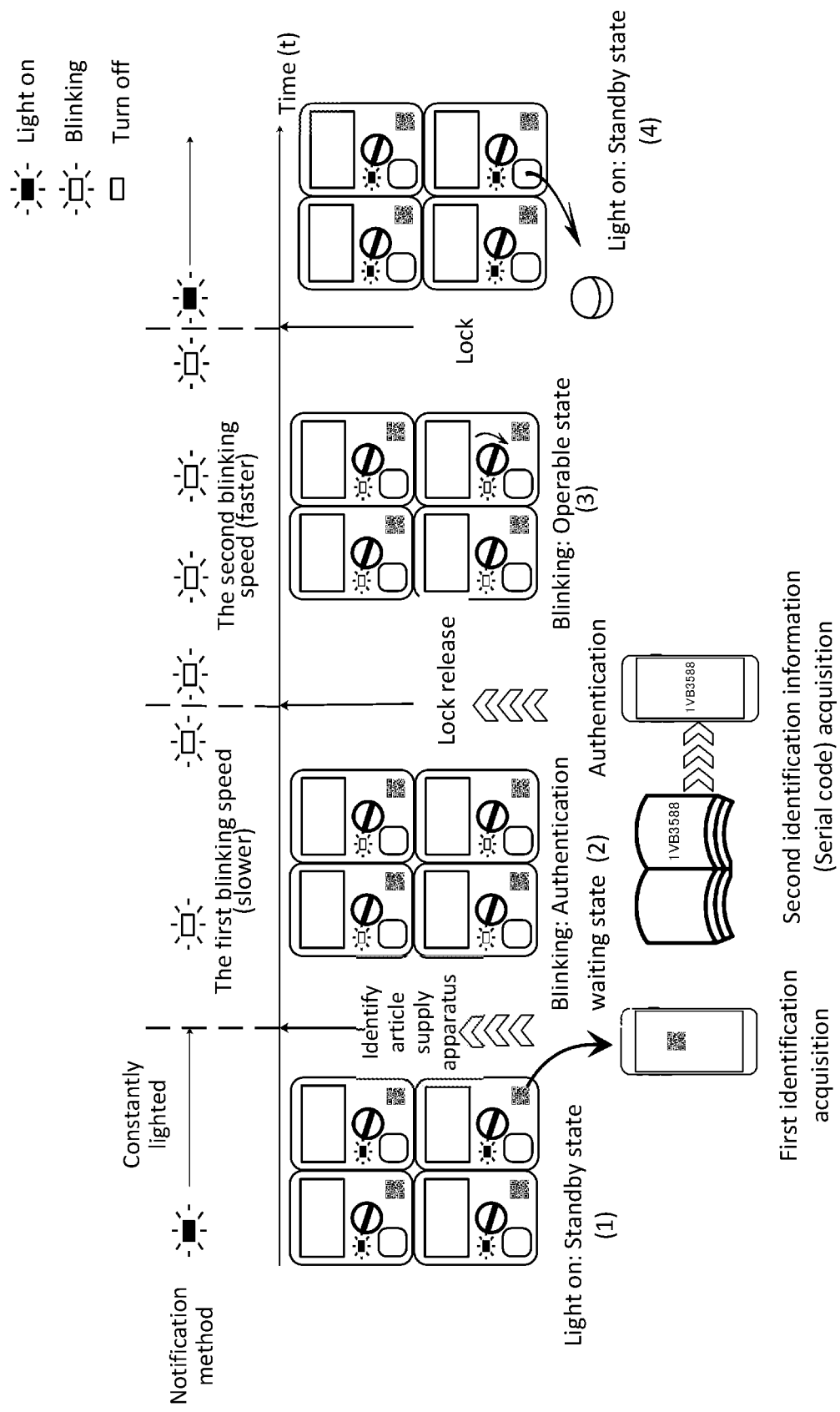
FIG. 23 is a diagram showing a timeline illustrating a notification according to the second embodiment.

Next, the notification processing of the article supply apparatus 1 (Step 10) will be explained, referring to the flowchart shown in FIG. 16 and the notification method controlled by the notification control unit 107 will be explained, referring to the time line shown in FIG. 23. The notification control unit 107 notifies of a standby state by controlling the notification unit 18 (Step 200). At this time, the light-emitting element of the notification unit 18 is lighted as shown as (1) in FIG. 23. When the communication unit 106 receives an authentication progressing signal (Yes in Step 201), the notification control unit 107 notifies of an authentication waiting state by controlling the notification unit 18 (Step 202). At this time, as shown as (2) in FIG. 23, the light-emitting element of the notification unit 18 blinks at first blinking speed. When the communication unit 106 receives a lock release signal (Yes in Step 203), the control unit 105 releases the lock of the lock unit 22 (Step 204). The notification control unit 107 receives a release notification from the lock unit 22 and then notifies of an operable state by controlling the notification unit 18 (Step 205). At this time, as shown as (3) in FIG. 23, the notification control unit 107 performs control, so that the light-emitting element of the notification unit 18 blinks at a second speed.

In order to judge a supply of an article, the control unit 105 of the article supply apparatus 1 determines whether or not an operation is performed to the handle 15 of the operation unit 104 (for example, one rotation) (Step 206). When the operation is performed to the handle 15 (for example, one rotation) (Yes in Step 206), an article is supplied to the take-out port 16 from the article supply unit 102 (Step 207). And the control unit 105 locks the lock unit 103 (Step 208). On the other hand, when no operation is performed to the handle 15 (No in Step 206), the control unit 105 determines whether or not a predetermined time (for example 1 minute) lapses after the lock is released (Yes in Step 210). When no operation is performed to the handle 15 (No in Step 206) and the predetermined time (for example 1 minute) lapses after the lock is released (Yes in Step 210), the control unit 105 locks the lock unit 103 (Step 208).

The notification control unit 107 receives a notification of lock form the lock unit 103, and the notification control unit 107 notifies of a standby state by controlling the notification unit 18 (Step 209). At this time, the notification control unit 107 turns on the light-emitting element of the notification unit 18 as shown as (3) in FIG. 23. Lastly, the control unit 105 makes a report to the effect that an article is supplied in a normal manner when the article is supplied in a normal manner, and makes a report to the effect that an article is not supplied when an article is not supplied (Step 211).

In addition, regarding a control performed from the release of the lock until an action of unlocking, in the above description, the control unit 105 determines whether or not a predetermined time lapses after the lock unit 103 is released and the lock unit 103 is turned into a locked state when the predetermined time lapses. This is only one example. For example, the lock control unit 623 of the lock control unit 103 measures time from when the lock release signal is sent, and when any article supply report, to the effect that an article is supplied in a normal manner, until a predetermined time lapses, is not received, the control unit 105 sends a lock signal to the control unit 105 of the article supply apparatus 1. In this case, the control unit 105 turns the lock unit 103 into a lock state.

In addition, in the above embodiment, a notification to the notification control unit 107 about lock and release of the lock unit 103 is exemplified referring to the structure in which the lock unit carries out it. However, the control unit 105 may perform such a notification. The above is the explanation of the notification processing of the article supply apparatus (Step 10 in FIG. 15).

In the above-described embodiment, the configuration in which a plurality of the article supply apparatus are provided is exemplified. However, the number of the article supply apparatuses may be one (1). In this case, the information included in the first identification information 11 is only information of a link to a page for authentication of the serial code. Therefore, the notification control unit 107 notifies of an authentication waiting state by controlling the notification unit 18, on condition that the terminal 2 acquires the first identification information including the information of the link to the page for authentication of the serial code.

In addition, in a notification method according to the above-described embodiment, although the notification control unit 107 notifies of an authentication waiting state at a first blinking speed, and notifies of an operable state at a second blinking speed, the notification method is not limited thereto. That is, as far as the notification method of the authentication waiting state is different from that of the operable state, any method can be adopted. For example, color of blinking light emitted from the light-emitting element may be respectively changed in the authentication waiting state and the operable state.

In the above embodiment, the device ID and URL which are information of link to the page for authentication, are included in the first identification information. Article identification information which identifies articles accommodated in the accommodation unit 12 may be included in the first identification information. In this case, when the terminal 2 acquires the article identification information, the terminal 2 transmits it to the server 3 whereby the server 3 displays the article information, which is read out based on the article identification information, on the display of the terminal 2.

As described above, the notification control unit 107 according to the embodiment, differently notifies of the state of the article supply apparatus which changes depending on the progress of operation procedure, in a notification method comprising the lighting and blinking of the light-emitting element. Since a user can grasp a transition of the operation procedure of the article supply apparatus 1, the user can know the timing at which the user performs an operation for receiving supply of an article. Therefore, it is possible to prevent a mistake by user in the operation procedure for supply of an article. In addition, according to the present embodiment, the terminal 2 displays detailed information to be informed the user of, such as the input screen for prompting the user to input the serial code, a guidance information for prompting the user to perform an operation of the article supply apparatus 1, the error screen etc. for notifying of error content. Therefore, even if the article supply apparatus 1 may be configured by the mechanical display such as the light-emitting element of the article supply apparatus 1, it is possible to prevent the user from making a mistake in the operation procedure.

Third Embodiment

Figure 24:
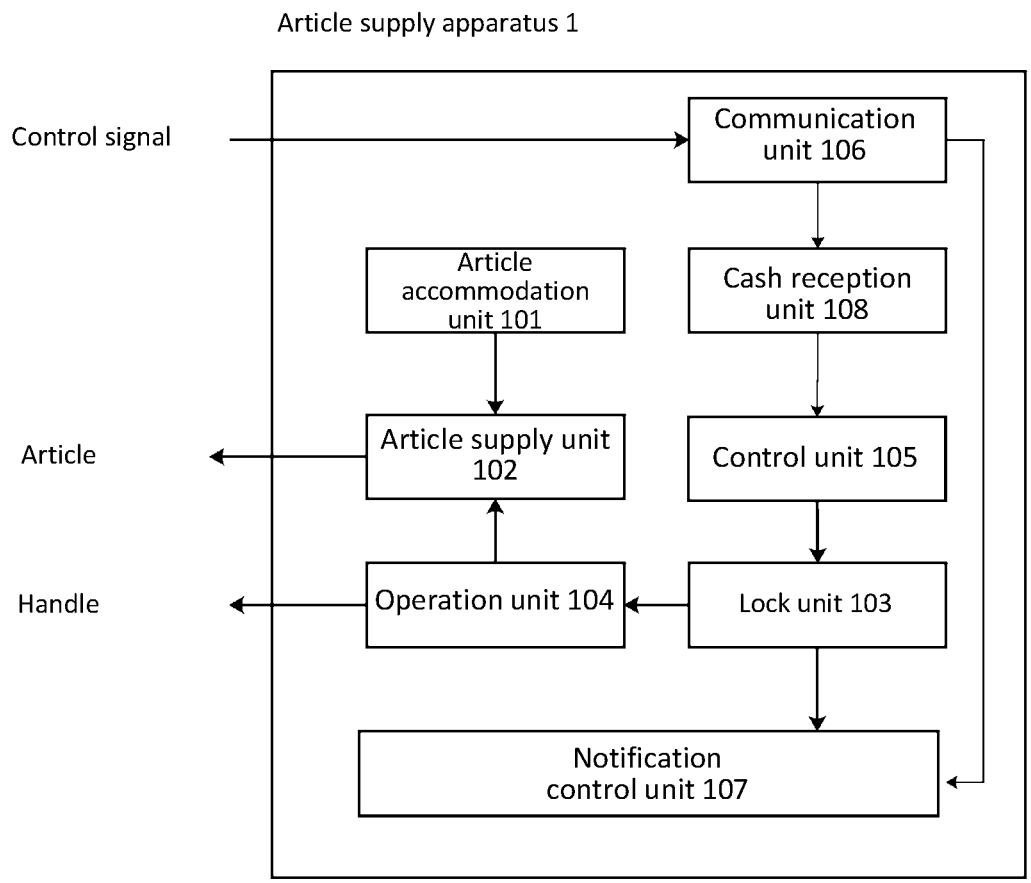
FIG. 24 is a block diagram of the article supply apparatus according to a third embodiment.

In the above-described embodiments, the notification control unit 107 performs control for notification of an operable state on condition that the serial code is authenticated. In the present embodiment, as an example, it is described that the notification control unit 107 notifies of an operable state on condition that a price is paid after the serial code is authenticated. In addition, the same symbols or signs are assigned to the same elements or similar elements and duplicate explanation thereof will be omitted. FIG. 24 is a block diagram of the article supply apparatus according to a third embodiment. The communication unit 106 gives a notice to the cash reception unit 108 when the lock release signal is received.

Figure 25:
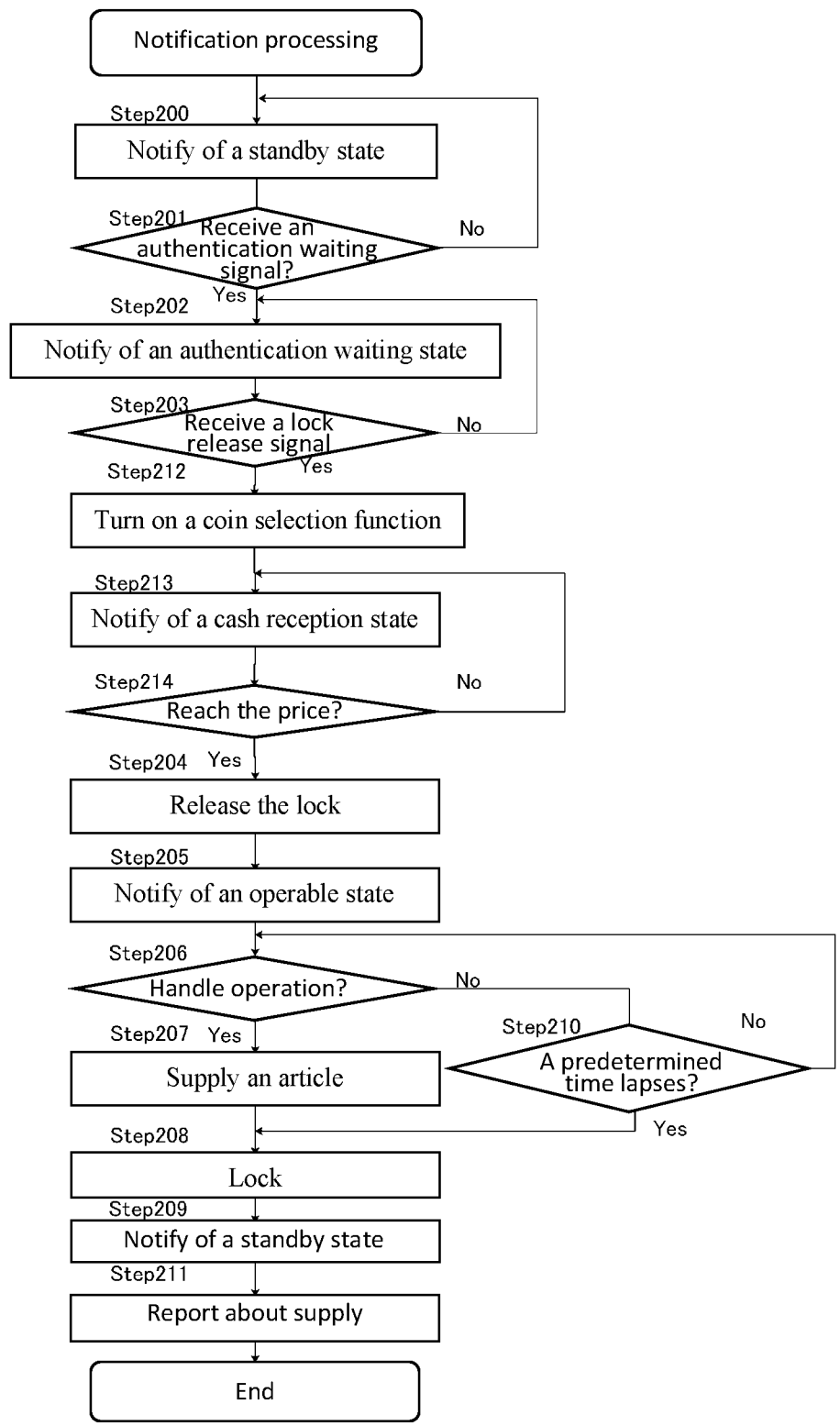
FIG. 25 is a flowchart illustrating an operation of the article supply device according to the third embodiment.

Next, description of an operation of an article supply system according to the present embodiment, will be give below. The operation of the article supply system according to the present embodiment is different from that according to the above-described embodiments, in that the notification processing in Step 10 according to the present embodiment is different from that according to the above-described embodiments. Therefore, the notification processing according to the present embodiment will be explained below referring to a flowchart in FIG. 25. It should be noted that in the notification processing according to the present embodiment, Steps 212-214 are inserted between the Step 203 and Step 204 shown in FIG. 16. Therefore, description of similar operations thereto will be omitted in the description below.

The notification control unit 107 of the article supply apparatus 1 notifies that the article supply apparatus 1 is in a standby state, by controlling the notification unit 18 (Step 200). At this time, the notification control unit 107 of the article supply apparatus 1 causes the light-emitting element to be lighted as shown as (1) of FIG. 23. When the communication unit 106 receives an authentication progressing signal (Yes in Step 201), the notification control unit 107 notifies of the authentication waiting state by controlling the notification unit 108 (Step 202). At this time, as shown as (2) in FIG. 23, the light-emitting element of the notification unit 18 blinks at the first blinking state. When the communication unit 106 receives a lock release signal (Yes in Step 203), the cash reception unit 108 switches the state of the function of the coin selection unit from an invalid state (Off state) to a valid state (On state) (Step 212).

The cash reception unit 108 determines whether or not the amount of money fed by the user reaches the price of an article (Step 214). When the fed amount reaches the price of the article, the cash reception unit 108 transmits a lock release signal to the control unit 105 (Step 214). When the control unit 105 receives the lock release signal from the cash reception unit 108, the control unit 105 releases the lock of the lock unit 103 (Step 204). At this time, as shown as (3) in FIG. 23, the light-emitting element of the notification unit 18 blinks at the second blinking speed. The above is the explanation of the notification processing of the article supply apparatus (Step 10 in FIG. 15).

As explained above, the notification control unit 107 according to the embodiments, performs control to notifying of the state of the article supply apparatus which changes depending on the progress of operation procedure, in a different notification method using the lighting and blinking of the light-emitting element. Since a user can grasp a transition of the operation procedure of the article supply apparatus 1, the user can know the timing at which the user performs an operation for receiving supply of an article. Therefore, it is possible to prevent a mistake by the user in the operation procedure for supply of an article. In addition, the terminal 2 according to the present embodiment, displays detailed information to be informed the user of, such as the input screen for prompting the user to input the serial code, a guidance information for prompting the user to perform an operation of the article supply apparatus 1, the error screen etc. for notifying of error content. Therefore, even if the article supply apparatus 1 may be configured by the mechanical display such as the light-emitting element of the article supply apparatus 1, it is possible to prevent the user from making a mistake in the operation procedure.

Third Modified Example

Figure 26:
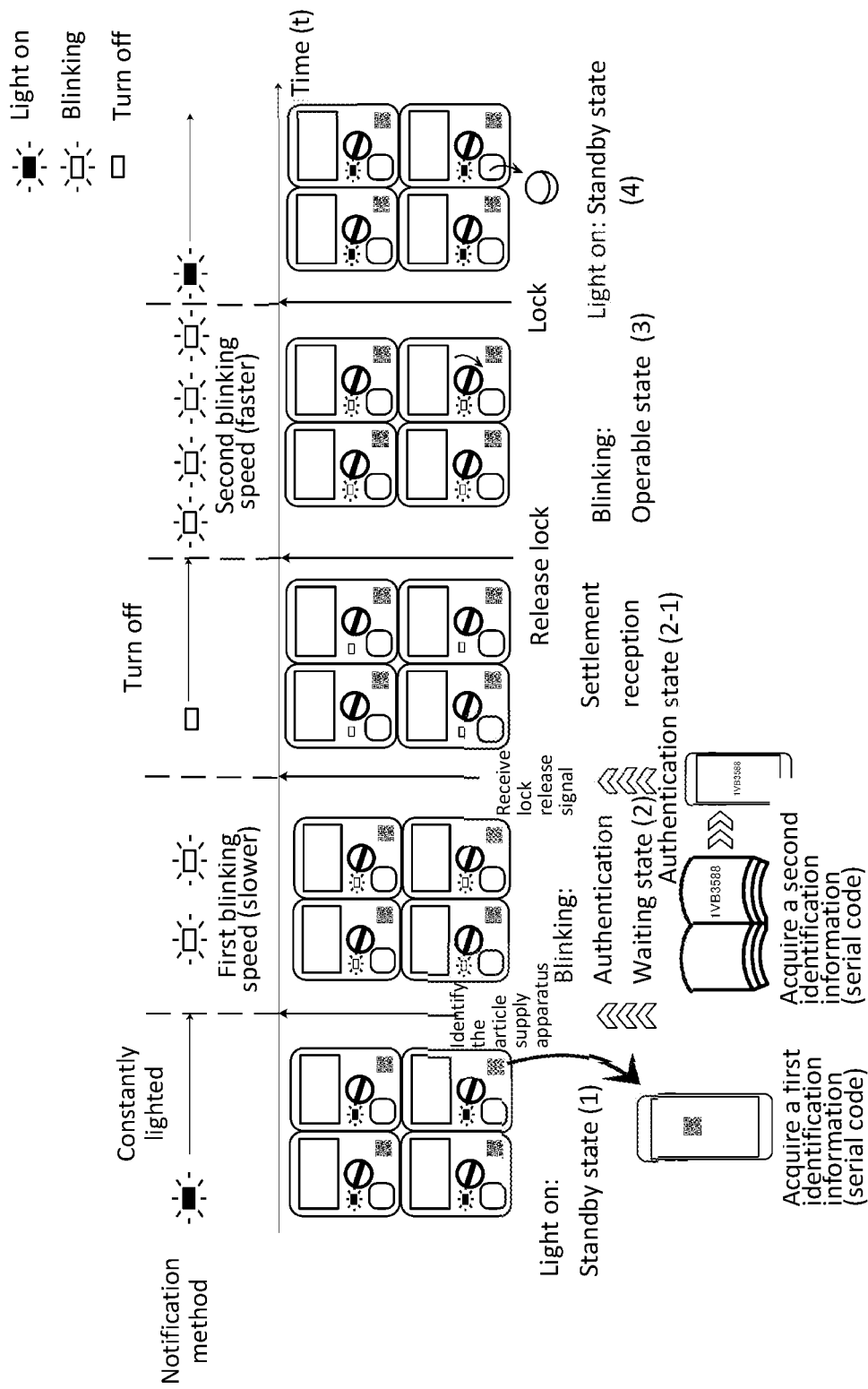
FIG. 26 is a diagram showing a timeline of a notification according to the third embodiment.

Description of a third modified example will be described below. Although in the embodiments described above, the notification control unit 107 performs control to notify of an operable state on condition that the money equivalent to the price of an article is fed after the lock release signal is received, another configuration may be adopted. For example, the notification control unit 107 performs a notification of a state where a settlement becomes acceptable, on condition that a lock release signal is received. The notification method according to the third modified example will be explained referring to a timeline shown in FIG. 26. In FIG. 26, (1) a standby state, (2) an authentication waiting state, (3) an operable state, and (4) a standby state, are the same as those shown in FIG. 23. FIG. 26 is different from FIG. 23 in that a settlement accepting state (fifth state) is inserted between (2) an authentication waiting state and (3) an operable state. In this explanation of a notification method according to the third modified example, the settlement accepting state is notified by turning off the light-emitting element. However, as far as the standby state, the authentication waiting state and the operable state are distinguish from one another, any other method may be adopted.

Fourth Embodiment

In the above-described embodiment, the information display body of the first identification information 11 includes a device ID and information of a link to a page for authentication of the identification information. However, according to the fourth embodiment, the information of a link to a page for authentication of the identification information and the device ID are configured by respectively different information display bodies. In addition, although the configuration according to the present embodiment, is applied to the first embodiment in the explanation set forth below, it may be applied to the second embodiment.

Figure 27:
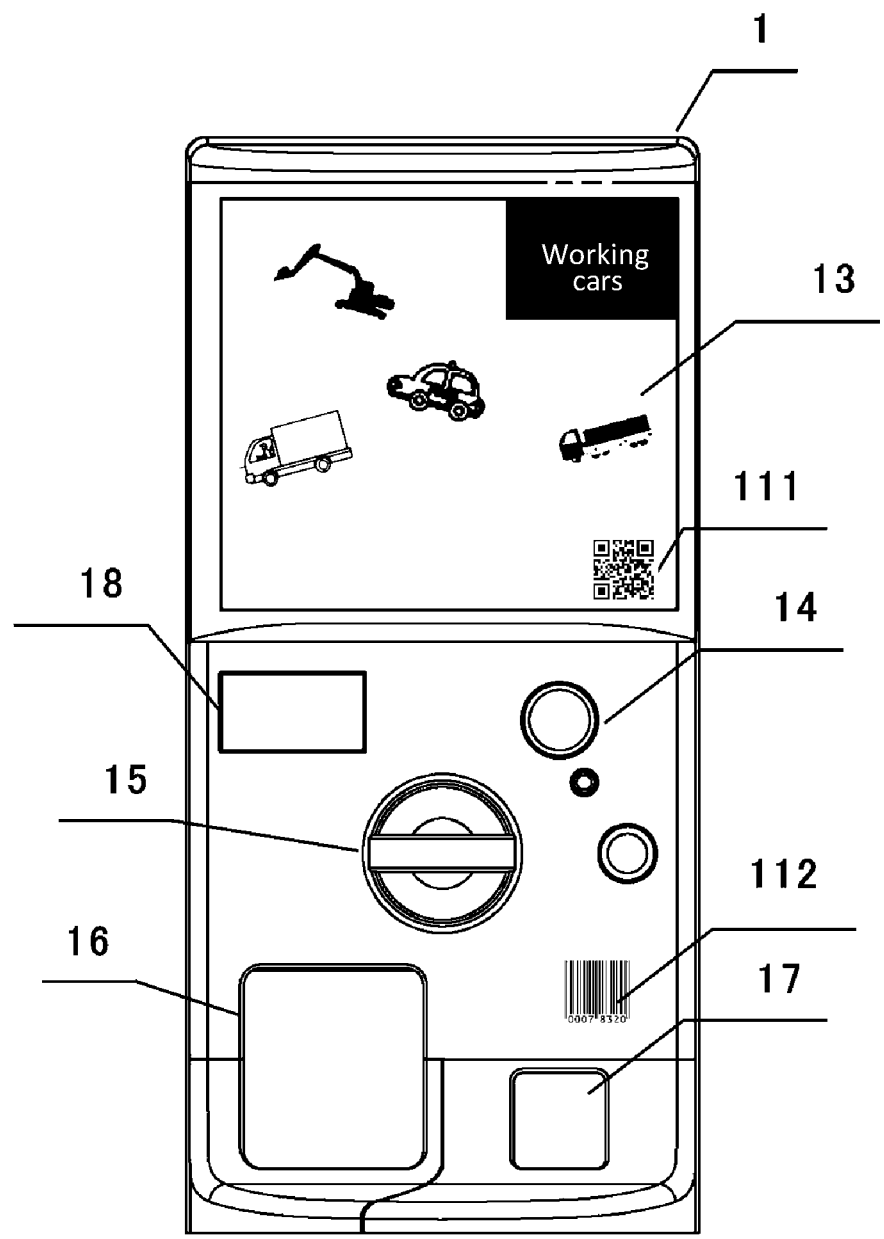
FIG. 27 is a front view of the article supply apparatus according to a fourth embodiment.

FIG. 27 is a front view of an article supply apparatus according to the fourth embodiment.

In the present embodiment, on a front face of the article supply apparatus 1, a QR code (two-dimensional code) is displayed as an information display body for the information of a link to a page for authentication of the identification information and a bar code (one dimensional code) is displayed as an information display body for the device ID.

As explained in the above-described embodiments, a description of an article is shown on the display 13 of the article supply apparatus 1. In the present embodiment, a first type of first identification information 111 (information display body: QR code) is displayed (printed). The first type of identification information 111 includes at least URL which is information of a link to a page for authentication of a second type of first identification information 112 carried in a magazine 5. In addition, the first type of identification information 111 may includes article identification information (article ID), the price of the article and the like in addition to the above-listed information. On a face of the article supply apparatus 1, the second type of first identification information 112 (information display body: bar code) is displayed (printed). The second type of first identification information 112 includes at least uniquely assigned article supply apparatus identification information (device ID) for identifying the article supply apparatus 1. The first type of first identification information 111 is arranged at a position different from that of the second type of first identification information 112, so that the position of the first type of first identification information 111 is higher than that of the second type of first identification information 112.

Figure 28:
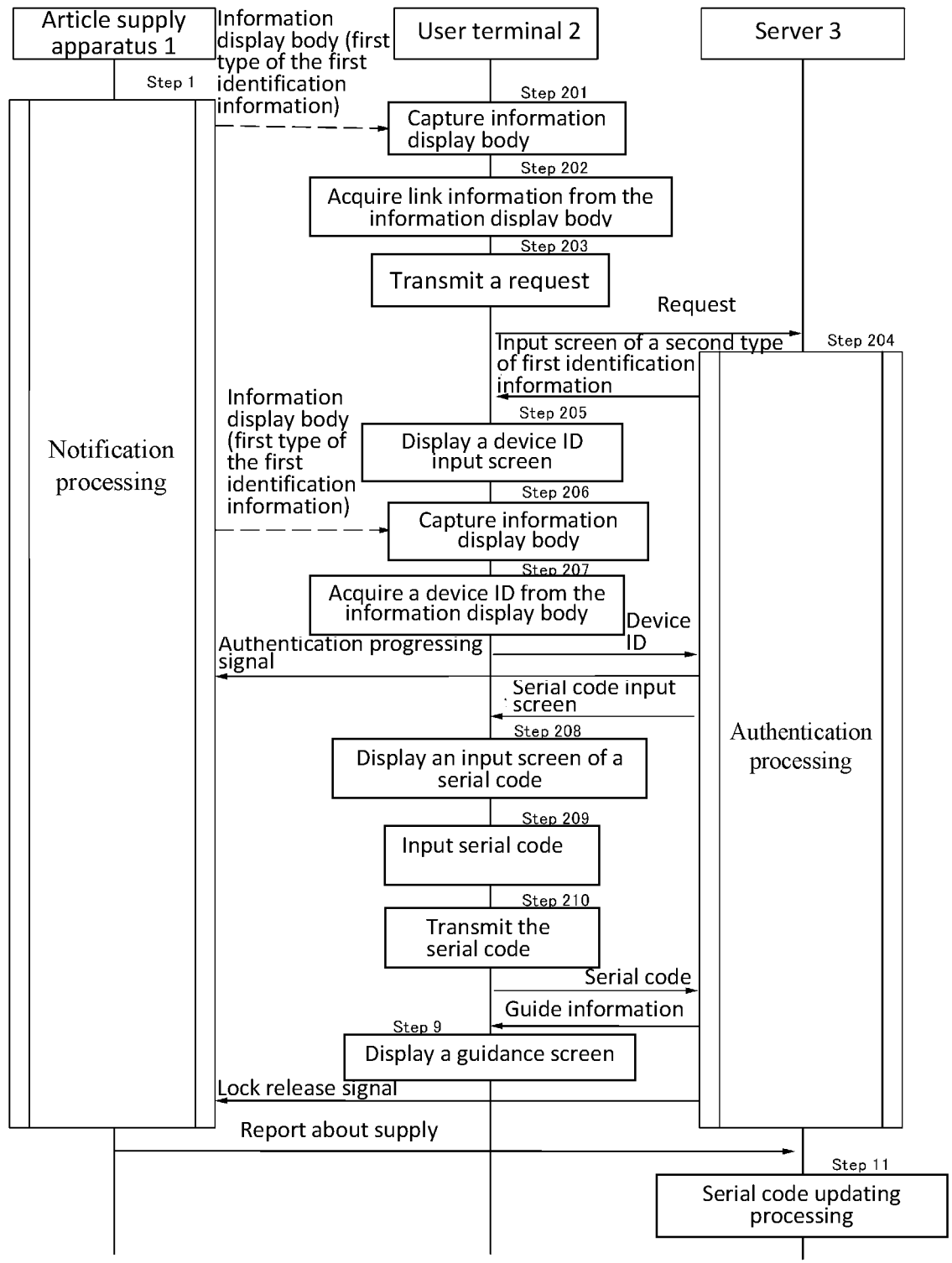
FIG. 28 is a sequence diagram illustrating an operation of an article supply apparatus system according to the fourth embodiment.

A flow of an entire process of the article supply system according to the present embodiment, will be explained, referring to a sequence diagram shown in FIG. 28. The article supply apparatus 1 performs a notification processing (Step 1).

The user acquires an information display body of the first type of first identification information 111 displayed on the article supply apparatus 1. The acquisition of the information display body is performed by an operation of the user, using a photographing function of a photographing unit 302 provided in the terminal (Step 201). The user operates the terminal 2 so that the information display body of the first type of first identification information 111 is displayed on the display 13 of any one of a plurality of article supply apparatuses 1 capable of supplying an article, and the user photographs the information display body.

The information display body acquisition unit 510 of the terminal 2 acquires the first type of first identification information 111 from the captured information identification body for the first type of first identification information 111. In the present embodiment, the acquired first type of first identification information 111 is information of a link to means for authentication of the serial code 12 (for example, URL) (Step 202). In the present embodiment, the server 3 is set as a link destination.

The serial code acquisition unit 511 transmits, to the server 3, a request which requests a transmission of an input screen for inputting the serial code, based on the information of the link destination (Step 203).

The server 3 receives the request from the terminal 2 and performs authentication processing (Step 204). The details of the authentication processing is described later.

When the terminal 2 receives the input screen of the second type of first identification information 112 from the server 3, the terminal 2 displays the received input screen thereon (Step 205). The user operates the terminal 2 so as to display, on the display 31 thereof, the information display body of the second type of first identification information 112 on the one of the plurality of article supply apparatuses 1 capable of supplying an article (which may be an article supply apparatus 1 different from the article supply apparatus 1 on which the scanned information display body of the first type of first identification information 111 of the article supply apparatus 1 is displayed) and the user photographs the displayed information display body (Step 206).

The information display body acquisition unit 510 of the terminal 2 acquires the second type of first identification information 112 from the photographed information display body of the second type of first identification information 112 (Step 207). In the present embodiment, the acquired second type of first identification information 112 is the device ID (12560) of the article supply apparatus 1. The information display body acquisition unit 510 transmits the device ID (12560) to the server 3, based on the link destination information (Step 211).

The server 3 receives the device ID from the terminal 2, and performs authentication processing (Step 204). The server 3 transmits an authentication progressing signal to the article supply apparatus 1 identified from the device ID. The notification processing is performed (Step 10).

When the terminal 2 receives an input screen for inputting the serial code without receiving an error notification screen, from the server 3, the serial code acquisition unit 511 of the terminal 2 displays the input screen for the serial code (Step 208). The user inputs the serial code in the displayed input screen (Step 209). In the present embodiment, the user inputs 1VB3588 as the serial code in the input screen. And, the serial code acquisition unit 511 transmits the serial code to the server 3 (Step 210).

The server 3 receives the serial code and performs authentication processing (Step 204). The details of the authentication processing will be described later.

When the supply information guiding unit 512 of the terminal 2 receives the guidance information, the terminal 2 displays the guidance information (Step 009).

Figure 29:
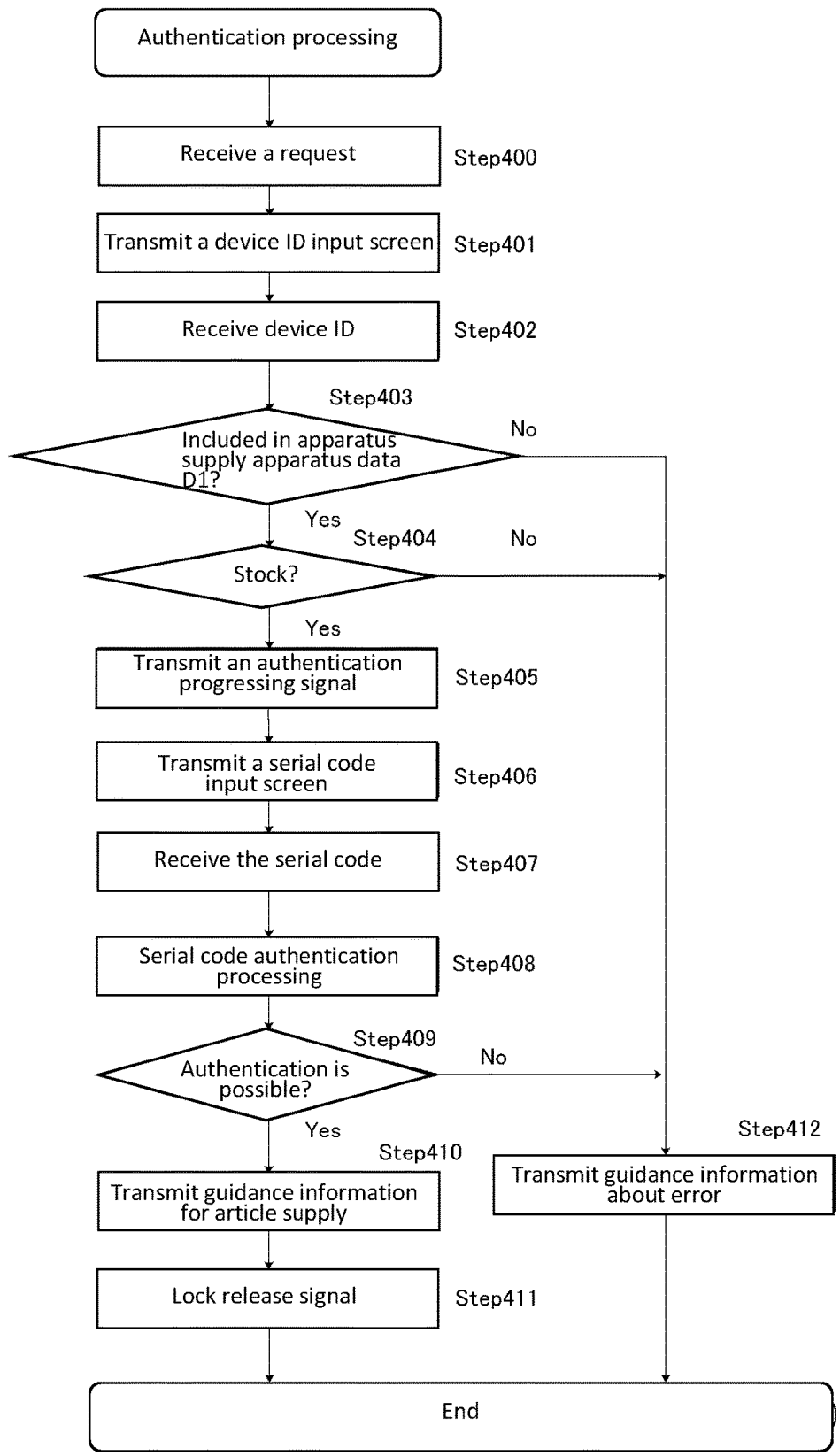
FIG. 29 is a flowchart illustrating an operation of a server according to the fourth embodiment.

Next, the authentication processing of the server 3 (Step 204) will be explained referring to a flowchart shown in FIG. 29.

The serial code authentication unit 622 of the server 3 receives the request from the terminal 2 (Step 400), and transmits an input screen for the device ID (the second type of first identification information) (Step 401). The article supply apparatus determination unit 621 receives the device ID which is inputted in the input screen (Step 402). In the present embodiment, the received device ID is 12560. The article supply apparatus determination unit 621 performs determination of the device ID by using the article supply apparatus data D1 (Step 403). In the determination of the device ID, it is determined whether or not the acquired device ID is included in the article supply apparatus data D1. When the acquired device ID is included in the article supply apparatus data D1 (Yes in Step 403), the stock quantity of the articles in the article supply apparatus 1 to which the acquired device ID is assigned is checked (Step 404). When there is a stock, it is determined that the article supply apparatus 1 having the device ID acquired by the user is an article supply apparatus capable of supplying an article, and then an authorization processing signal is sent to the article supply apparatus 1 (Step 405). In the present embodiment, the acquired device ID is 12560, and is included in the article supply apparatus data D1. On the other hand, when the acquired device ID is not included in the article supply apparatus data D1 (No in Step 403), it is determined that the article supply apparatus 1 having the device ID acquired by the user is not an article supply apparatus capable of supplying an article, and then error guidance information is transmitted to the terminal 3 (Step 412). FIG. 21 is a diagram showing an example of guidance information for an error of the article supply apparatus. Next, the serial code authentication unit 622 transmits a serial code input screen to the terminal 2 (Step 406). When the serial code authentication unit 622 receives the serial code inputted in the input screen (Step 407), the authentication processing of the acquired serial code is performed (Step 408). In the present embodiment, the acquired serial code is 1VB3588. and the serial code 1VB3588 is an object to be authenticated. The serial code authentication unit 622 compares the acquired serial code with serial codes in the serial code data D2. When the acquired serial code is included in the serial code data D2 and an authentication completed flag is not set for the serial code, the acquired serial code is authenticated, whereby the serial code authentication unit 622 determines that the acquired serial code has been authenticated (Yes in Step 409). In addition, the serial code authentication unit 622 performs authentication of an expiration date of the serial code inputted in the input screen if the expiration date is set for the serial code. When the expiration date for the serial code is valid and the serial code is authenticated, the article supply apparatus determination unit 621 transmits a guidance information regarding supply of an article (Step 410). A supply permission signal is transmitted to the article supply apparatus 1 having the device ID identified by the article supply apparatus determination unit 621 (Step 411). In the present embodiment, the lock control section 623 transmits the supply permission signal to the article supply apparatus 1 to which the device ID 12560 is assigned.

In the other hand, when the acquired serial code is authenticated (No in Step 409), the error guidance information is transmitted to the terminal 2 (Step 410). For example, as shown in FIG. 21, the error guidance information is transmitted to the terminal 2. The above is the description of the authentication processing in the server 3 (Step 204).

The present embodiment has advantages in addition to those of the above-described embodiment. According to the present embodiment, the first type of first identification information which is common among articles and the second type of first identification information which is uniquely assigned to respective article supply apparatuses is separately used. By this configuration, articles stored in an accommodation unit of the article supply apparatus can be replaced with another kind of articles, by changing only the first type of first identification information displayed on the display 13 of the article supply apparatus, without changing the second type of the first identification information displayed on the article supply apparatus. Therefore, it is possible to reduce a work load on an operator side.

Although only some exemplary embodiments have been described in detail above, those skilled in the art will readily appreciate that many modifications are possible in the exemplary embodiments without materially departing from the novel teachings and advantages. Accordingly, all such modifications are intended to be included within the scope.

The invention claimed is:

1. An article supply apparatus, which supplies an article, comprising:
    an accommodation unit in which articles are accommodated;
    a supply unit which supplies at least one of the articles accommodated in the accommodation unit;
    an operation unit, which performs an operation in order to supply the at least one of the articles from the supply unit;
    a lock unit which locks the operation unit so as to make the operation to the operation unit unavailable;
    a control unit which releases a lock of the lock unit; and
    a notification control unit, which notifies of a first state where the lock of the lock unit is released and a second state where the operation of the operation unit is completed, and a third state where authentication of the article supply apparatus is in progress,
    wherein ways of notification of the first state, the second state and the third state are different from one another.

2. The article supply apparatus according to claim 1, wherein the control unit releases the lock under condition of at least one of completion of payment of a price, and completion of authentication for releasing the lock of the lock unit.

3. The article supply apparatus according to claim 1, further including a detection unit, which detects payment of the price of the article, wherein the control unit releases the lock on condition that the detection unit detects completion of payment of the price of the article.

4. The article supply apparatus according to claim 1, further including a display unit which displays a first identification information including a destination of the authentication for releasing the lock of the lock unit.

5. The article supply apparatus according to claim 4, wherein the control unit releases the lock of the lock unit on condition that the article supply apparatus, from which the at least one of the articles is supplied, is identified by acquiring the first identification information, and the authentication for releasing the lock unit is completed.

6. The article supply apparatus according to claim 4, wherein the first identification unit includes access information for acquiring second identification information in order to release the lock unit.

7. The article supply apparatus according to claim 6, wherein the second identification information is displayed outside the article supply apparatus.

8. The article supply apparatus according to claim 4, wherein the first identification information includes identification information for identifying the article supply apparatus.

9. The article supply apparatus according to claim 4, wherein the first identification information includes article identification information for identifying the articles accommodated in the accommodation unit.

10. The article supply apparatus according to claim 4, wherein the notification control unit notifies, in different ways, of the first state, the second state, the third state and a fourth state where the article supply apparatus is in a standby state for supply of the at least one of the articles.

11. The article supply apparatus according to claim 1, the notification control unit performs a notification in deferent ways in any combination of turning off, lighting and blinking of a light-emitting element, and blinking of the light-emitting element at different speeds.

12. An article supply system, comprising:
    an article supply apparatus;
    a terminal, which is configured to obtain identification information of the article supply apparatus from the article supply apparatus;
    a server, which is configured to receive the information transmitted from the terminal, to communicate with the article supply apparatus, and to authenticate the article supply apparatus;
    wherein the article supply apparatus including:
        an accommodation unit which accommodates articles;
        a supply unit which supplies one of the articles accommodated in the accommodation unit;
        an operation unit, which performs an operation to supply at least one of the articles from the supply unit;
        a lock unit which locks the operation unit so as to make the operation to the operation unit unavailable;
        a control unit which releases a lock of the lock unit; and
        a notification control unit, which notifies of a first state where the lock of the lock unit is released, a second state where the operation of the operation unit is completed, and a third state where authentication of the article supply apparatus is in progress in the server,
    wherein ways of notification of the first state, the second state and the third state are different from one another.

* * * * *